(12) United States Patent
Takae et al.

(10) Patent No.: US 10,025,309 B2
(45) Date of Patent: Jul. 17, 2018

(54) TRAVEL CONTROL DEVICE

(71) Applicant: Nissan Motor Co., Ltd., Yokohama-shi, Kanagawa (JP)

(72) Inventors: Yasuhiko Takae, Kanagawa (JP); Nariaki Etori, Kanagawa (JP); Yoji Seto, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/543,188

(22) PCT Filed: Jun. 25, 2015

(86) PCT No.: PCT/JP2015/068399
§ 371 (c)(1),
(2) Date: Jul. 12, 2017

(87) PCT Pub. No.: WO2016/113926
PCT Pub. Date: Jul. 21, 2016

(65) Prior Publication Data
US 2018/0173231 A1   Jun. 21, 2018

(30) Foreign Application Priority Data
Jan. 13, 2015   (JP) .................................. 2015-003893

(51) Int. Cl.
*G05D 1/00*   (2006.01)
*B60W 30/14*   (2006.01)
(Continued)

(52) U.S. Cl.
CPC .......... *G05D 1/0088* (2013.01); *B60W 30/12* (2013.01); *B60W 30/143* (2013.01);
(Continued)

(58) Field of Classification Search
CPC .. G05D 1/0088; B60W 30/12; B60W 30/143; B60W 30/18163; B60W 50/10; B60W 50/14
See application file for complete search history.

(56) References Cited

U.S. PATENT DOCUMENTS

| 2005/0216168 | A1 | 9/2005 | Arai et al. | |
| 2014/0309871 | A1* | 10/2014 | Ricci | ........................ B60Q 1/00 701/36 |
| 2016/0046290 | A1* | 2/2016 | Aharony | ............ G06K 9/00798 701/41 |

FOREIGN PATENT DOCUMENTS

| JP | H08201097 A | 8/1996 |
| JP | 2005319891 A | 11/2005 |

(Continued)

*Primary Examiner* — Calvin Cheung
(74) *Attorney, Agent, or Firm* — Young Basile Hanlon & MacFarlane, P.C.

(57) ABSTRACT

A travel control device comprises a detection unit configured to detect a travel state of a subject vehicle, a determination unit configured to determine a travel scene of the subject vehicle, a storage unit configured to store presentation information to be presented to a user in each travel scene, a presentation unit configured to present the presentation information corresponding to the travel scene to the user, an input unit for the user to input response information, and a control unit configured to control travel of the subject vehicle on the basis of the response information. The storage unit stores a priority level when presenting the presentation information. The presentation unit presents the presentation information of which the priority level is highest to the user when an actual travel scene of the subject vehicle falls under travel scenes corresponding to two or more items of the presentation information.

18 Claims, 17 Drawing Sheets

(51) Int. Cl.
  *B60W 30/18* (2012.01)
  *B60W 50/10* (2012.01)
  *B60W 50/14* (2012.01)
  *B60W 30/12* (2006.01)

(52) U.S. Cl.
  CPC ...... *B60W 30/18163* (2013.01); *B60W 50/10* (2013.01); *B60W 50/14* (2013.01); *B60W 2050/146* (2013.01); *B60W 2550/20* (2013.01)

(56) References Cited

FOREIGN PATENT DOCUMENTS

| | | | |
|---|---|---|---|
| JP | 2008185523 | A | 8/2008 |
| JP | 2010100093 | A | 5/2010 |
| JP | 2014044707 | A | 3/2014 |
| JP | 2014046748 | A | 3/2014 |
| JP | 2014076689 | A | 5/2014 |
| JP | 2014092795 | A | 5/2014 |

* cited by examiner

Fig.2

| Travel scene | Determination condition | Priority level | Presentation condition | Waiting cancellation condition |
|---|---|---|---|---|
| Scene of catching up with preceding vehicle | "Preceding vehicle exists ahead" and "Vehicle speed of preceding vehicle < Set vehicle speed of subject vehicle" | A | TTC with preceding vehicle is S1 or less | TTC with preceding vehicle is S2 (S2<S1) or less |
| Scene of approaching tollgate | "Time for arriving at tollgate located ahead is within 60 seconds" | B | Time for arriving at tollgate is S3 or less | Time for arriving at tollgate is S4 (S4<S3) or less |
| Scene of approaching merging point | "Time for arriving at merging point located ahead is within 60 seconds" | C (A<C) | Time for arriving at merging point is S5 or less | Time for arriving at merging point is S6 (S6<S5) or less |
| Obstruction scene of subject vehicle's lane | "Traveling lane of subject vehicle will disappear within predetermined distance" | D | Time for arriving at obstructed point is S7 or less | Time for arriving at obstructed point is S8 (S8<S7) or less |
| Scene of avoiding object on road | "Pedestrian, bicycle, motorcycle, or fallen object on road exists ahead" | E | Object on road is detected | TTC with object on road is S9 or less |
| Scene of being caught up by vehicle from behind | "Following vehicle exists in traveling lane of subject vehicle" and "Vehicle speed of following vehicle > Vehicle speed of subject vehicle" | F | TTC with following vehicle is S10 or less | TTC with following vehicle is S11 (S11<S10) or less |
| Emergency evacuation scene | "Onboard equipment is not operated within predetermined period of time" and "Driver is determined to be incapable of driving, on the basis of images captured by in-vehicle camera" | G | Determination condition satisfied | Predetermined time has passed after presentation of message |
| Scene of lane transfer toward destination | "Destination is set" and "Time for arriving at lane change point necessary for arriving at destination is within 60 seconds" | H | Time for arriving at lane change point is S12 or less | Time for arriving at lane change point is S13 (S13<S12) or less |
| Scene of heading to SA/PA | "Time for arriving at SA/PA is within 60 seconds" | I (A<I) | Time for arriving at SA/PA is S14 or less | Time for arriving at SA/PA is S15 (S15<S14) or less |

Fig.3

Next page

Previous page

Preceding vehicle is found. Which action do you select?

Overtake

Follow

TRAVEL CONTROL DEVICE

CROSS REFERENCE TO RELATED APPLICATION

This application claims priority to Japanese Patent Application No. 2015-003893, filed on Jan. 13, 2015, incorporated herein by reference.

TECHNICAL FIELD

The present invention relates to a travel control device.

BACKGROUND

For a subject vehicle traveling, techniques of maintaining the distance between the subject vehicle and a preceding vehicle at a constant distance have heretofore been known. Among such techniques, there is known a technique of determining whether or not the subject vehicle can overtake the preceding vehicle and automatically executing the overtaking of the preceding vehicle when a determination is made that the overtaking is possible (e.g. JP2014-76689A).

In the above prior art, travel of the subject vehicle is controlled without confirming the intention of a user and, therefore, the travel control may be performed in a different manner from the intention of the user.

SUMMARY

A problem to be solved by the present invention is to provide a travel control device that, when controlling travel of a subject vehicle, can perform appropriate control based on the intention of the user.

The present invention solves the above problem by providing a travel control device. The travel control device determines a travel scene on the basis of a travel state of a subject vehicle and presents presentation information corresponding to the travel scene to a user. When the user inputs response information in response to the presentation information, the travel control device controls travel of the subject vehicle on the basis of the response information which the user inputs. When an actual travel scene of the subject vehicle falls under travel scenes corresponding to two or more items of the presentation information, the travel control device presents the presentation information of which the priority level is highest to the user.

According to the present invention, the user can be presented with the presentation information which is more needed by the user in accordance with the travel scene of the subject vehicle. Travel of the subject vehicle can be controlled on the basis of the response information which the user inputs in response to such presentation information, and appropriate travel control based on the determination of the user can thereby be performed.

BRIEF DESCRIPTION OF THE DRAWINGS

FIG. 2 is a view illustrating an example of a table used for determination of a travel scene;

FIG. 3 is a view illustrating an example of presentation information presented by a presentation device in a scene of catching up with a preceding vehicle;

DETAILED DESCRIPTION OF THE EMBODIMENTS

Hereinafter, one or more embodiments of the present invention will be described with reference to the drawings. In the embodiments, the travel control device according to the present invention will be described by exemplifying a configuration to be equipped in a vehicle.

First Embodiment

Figure 1:
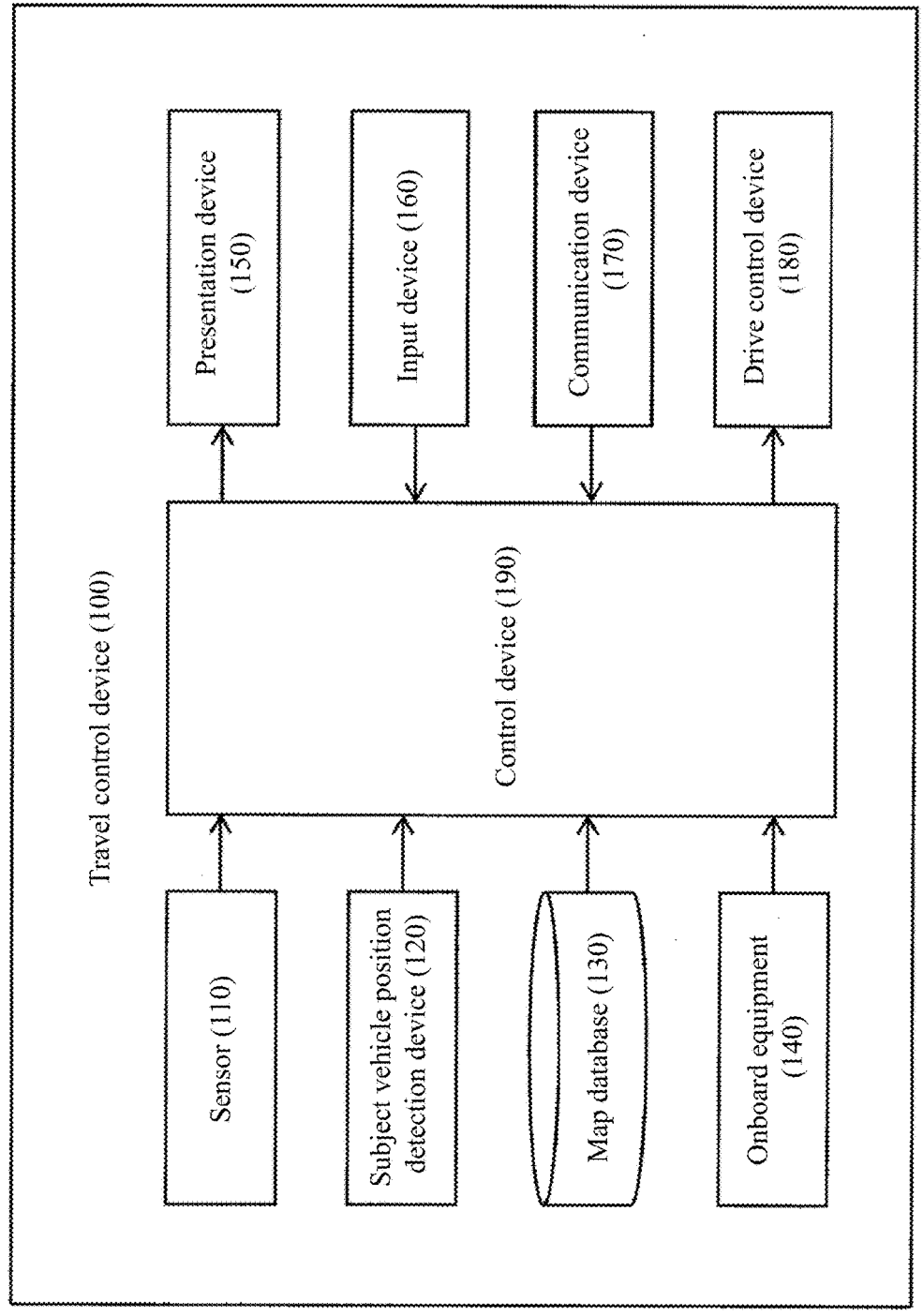
FIG. 1 is a block diagram of a travel control device according to one or more embodiments of the present invention.

FIG. 1 is a block diagram illustrating the configuration of a travel control device 100 according to the present embodiment. As illustrated in FIG. 1, the travel control device 100 according to the present embodiment has a sensor 110, subject vehicle position detection device 120, map database 130, onboard equipment 140, presentation device 150, input device 160, drive control device 180, control device 190, and communication device 170. These devices are connected to one another via a controller area network (CAN) or other in-vehicle LAN for mutually exchanging information.

The sensor 110 detects a travel state of the subject vehicle. Examples of the sensor 110 include a front camera that captures images ahead of the subject vehicle, a rear camera that captures images behind the subject vehicle, a front radar that detects obstacles ahead of the subject vehicle, a rear radar that detects obstacles behind the subject vehicle, side radars that detect obstacles existing at sides of the subject vehicle, a vehicle speed sensor that detects the vehicle speed of the subject vehicle, and an in-vehicle camera that captures images of the driver. The sensor 110 may be configured with one of the above-described various sensors or may also be configured with a combination of two or more sensors. The detection results of the sensor 110 are output to the control device 190.

The subject vehicle position detection device 120 is composed of a GPS unit, gyro-sensor, vehicle speed sensor, and other necessary components. The subject vehicle position detection device 120 detects radio waves transmitted from a plurality of communication satellites using the GPS unit to periodically acquire positional information of a target vehicle (subject vehicle) and detects the current position of the target vehicle on the basis of the acquired positional information of the target vehicle, angle variation information acquired from the gyro-sensor, and the vehicle speed acquired from the vehicle speed sensor. The positional information of the target vehicle detected by the subject vehicle position detection device 120 is output to the control device 190.

The map database 130 stores map information that includes positional information of various facilities and specific points. Specifically, the map database 130 stores positional information of merging points, branching points, tollgates, positions at which the number of lanes decreases, service areas (SA)/parking areas (PA), etc. together with the map information. The control device 190 can refer to the map information stored in the map database.

The onboard equipment 140 includes various devices equipped in the vehicle and can be operated by the driver. Examples of such onboard equipment include a steering, accelerator pedal, brake pedal, navigation device, audio device, air conditioner, hands-free switch, power window, wiper, light, flasher, and horn. When the driver operates the onboard equipment 140, its information is output to the control device 190.

The presentation device 150 may be, for example, a device such as a display of a navigation device, a display incorporated in a rearview mirror, a display incorporated in a meter unit, a head-up display projected on a windshield, and a speaker of an audio device. The presentation device 150 presents presentation information, which will be described later, to the driver under the control by the control device 190. A method of presenting the presentation information will also be described later.

The input device 160 may be, for example, a device such as a dial switch that allows input by the driver's hand operation, a touch panel disposed on a display screen, and a microphone that allows input by the driver's voice. In the present embodiment, the driver can operate the input device 160 thereby to input response information in response to the presentation information which is presented by the presentation device 150. The response information input via the input device 160 is output to the control device 190.

The communication device 170 performs communication with communication equipment located outside the vehicle. For example, the communication device 170 performs vehicle-to-vehicle communication with another vehicle, performs road-to-vehicle communication with equipment provided at a road shoulder, or performs wireless communication with an information server provided outside the vehicle and can thereby acquire various items of information from the external equipment. The information acquired by the communication device is output to the control device 190.

The drive control device 180 controls travel of the subject vehicle. For example, when the subject vehicle follows a preceding vehicle, the drive control device 180 controls the operation of a drive mechanism (which includes the operation of an internal-combustion engine in the case of an engine car and the operation of an electric motor in the case of an electric car and further includes the torque distribution for an internal-combustion engine and electric motor in the case of a hybrid car) and the braking operation to achieve the acceleration, deceleration and vehicle speed so that the distance between the subject vehicle and the preceding vehicle can be maintained at a constant distance. When the subject vehicle performs lane change such as overtaking of a preceding vehicle, the drive control device 180 controls the operation of a steering actuator to control the operation of wheels and thereby executes the turning control of the subject vehicle. Other well-known methods can also be used as a travel control method by the drive control device 180.

The control device 190 is composed of a read only memory (ROM) that stores programs for controlling travel of the subject vehicle, a central processing unit (CPU) that executes the programs stored in the ROM, and a random access memory (RAM) that functions as an accessible storage device. Another operation circuit such as a micro processing unit (MPU), digital signal processor (DSP), application specific integrated circuit (ASIC), and field programmable gate array (FPGA) can also be used as substitute for or in addition to the CPU.

The control device 190 executes the programs stored in the ROM using the CPU thereby to achieve a travel information acquisition function to acquire information regarding a travel state of the subject vehicle, a travel scene determination function to determine a travel scene of the subject vehicle, a presentation information determination function to determine presentation information to be presented to the driver in accordance with the travel scene, a presentation function to present the presentation information to the driver, a response information acquisition function to acquire response information which the driver inputs in response to the presentation information, and a travel control function to control travel of the subject vehicle. Each function of the control device 190 will be described below.

To determine the travel scene of the subject vehicle, the control device 190 uses the travel information acquisition function to acquire the travel information regarding the travel state of the subject vehicle. For example, the control device 190 can acquire the external image information around the vehicle captured by the front camera and rear camera and/or the detection results by the front radar, rear radar, and side radars as the travel information. The control device 190 can also acquire the vehicle speed information of the subject vehicle detected by the vehicle speed sensor and/or the image information of the driver's face captured by the in-vehicle camera as the travel information.

The control device 190 can further acquire information on the current position of the subject vehicle from the subject vehicle position detection device 120 as the travel information and can also acquire positional information of merging points, branching points, tollgates, positions at which the number of lanes decreases, service areas (SA)/parking areas (PA), etc. from the map database 130 as the travel information. In addition, the control device 190 can acquire information on the operation of the onboard equipment 140 by the driver from the onboard equipment 140 as the travel information.

When executing the travel scene determination function, the control device 190 refers to a table stored in the ROM of the control device 190 to determine the travel scene in which the subject vehicle is traveling. FIG. 2 is a view illustrating an example of the table used to determine the travel scene. For example, the table illustrated in FIG. 2 stores, for each travel scene, the name of a travel scene, a determination condition of the travel scene, a priority level of the presentation information, a presentation condition of the presentation information, and a waiting cancellation condition of the presentation information. The priority level of presentation information, the presentation condition of presentation information, and the waiting cancellation condition of presentation information will be described later.

For example, in the example illustrated in FIG. 2, the determination condition of a "scene of catching up with a preceding vehicle" is defined by two conditions: a condition of "detecting a preceding vehicle ahead" and a condition of "the vehicle speed of the preceding vehicle<the vehicle speed of the subject vehicle." In this case, the control device 190 determines whether or not the subject vehicle satisfies the above conditions, for example, on the basis of the detection results by the front camera and/or front radar, the vehicle speed of the subject vehicle detected by the vehicle speed sensor, the positional information of the subject vehicle, etc. When the above conditions are satisfied, the control device 190 determines that the subject vehicle is in the "scene of catching up with a preceding vehicle." Similarly, for all other travel scenes registered in the scene determination table, the control device 190 determines whether or not each determination condition is satisfied.

The control device 190 uses the presentation information determination function to determine the presentation information, which is to be presented to the driver, on the basis of the travel scene of the subject vehicle determined by the travel scene determination function. In the present embodiment, the ROM of the control device 190 stores the presentation information corresponding to each travel scene and the control device 190 extracts from the ROM the presentation information corresponding to the travel scene determined by the travel scene determination function.

FIG. 3 is a view illustrating an example of the presentation information which is displayed on the screen of a display as the presentation device 150 in the "scene of catching up with a preceding vehicle." When the travel scene of the subject vehicle is a "scene of catching up with a preceding vehicle," the control device 190 determines to present, as illustrated in FIG. 3, the presentation information which includes message information such as "A preceding vehicle is found. Which action do you select?" together with two options of "follow" and "overtake."

In some travel states of the subject vehicle, the actual travel scene of the subject vehicle may fall under travel scenes corresponding to two or more items of the presentation information. In such cases, the control device 190 refers to respective priority levels of the presentation information items registered in the table, as illustrated in FIG. 2, to determine the presentation information of which the prior level is higher as the presentation information to be presented to the driver.

For example, in the example illustrated in FIG. 2, when the travel scene of the subject vehicle corresponds to a "scene of catching up with a preceding vehicle," the travel scene of the subject vehicle may also correspond to a "scene of heading to an SA/PA" in which "the time for arriving at the service area or parking area is within 60 seconds." In such a case, the control device 190 compares the priority level of the presentation information in the "scene of catching up with a preceding vehicle" and the priority level of the presentation information in the "scene of heading to an SA/PA" to determine the presentation information with a higher prior level as the presentation information to be presented to the driver. For example, in the example illustrated in FIG. 2, the priority level "I" of the presentation information in the "scene of heading to an SA/PA" is higher than the priority level "A" of the presentation information in the "scene of catching up with a preceding vehicle." The control device 190 therefore determines the presentation information with the higher priority level in the "scene of heading to an SA/PA" as the presentation information to be presented to the driver.

In the example illustrated in FIG. 2, the travel scene of the subject vehicle may correspond to the "scene of catching up with a preceding vehicle" and also to a "scene of approaching a merging point." The priority level "C" of the presentation information in the "scene of approaching a merging point" is higher than the priority level "A" of the presentation information in the "scene of catching up with a preceding vehicle." The control device 190 can therefore determine the presentation information with the higher priority level in the "scene of approaching a merging point" as the presentation information to be presented to the driver.

The priority level of presentation information can be appropriately set in accordance with an attention attracting degree for the driver in each travel scene. For example, in an "emergency evacuation scene," a "scene of avoiding an object on a road," or the like, the importance of attracting attention of the driver is high and the priority level can be set higher accordingly. On the other hand, when it is considered that the importance of attracting attention of the driver is not higher in the "scene of heading to an SA/PA," the "scene of approaching a merging point," or the like than in other travel scenes, the priority level can be set lower accordingly. In an alternative embodiment, for example, the priority level of the presentation information in the "scene of heading to an SA/PA" and/or in the "scene of approaching a merging point" can be set lower than the priority level of the presentation information in the "scene of catching up with a preceding vehicle."

The control device 190 uses the presentation function to present the presentation information determined by the presentation information determination function to the driver. Specifically, the control device 190 transmits the presentation information determined by the presentation information determination function to the presentation device 150 and thereby allows it to present the presentation information determined by the presentation information determination function to the driver.

The control device 190 determines whether or not a presentation condition that defines the timing of presenting the presentation information is satisfied, and presents the presentation information to the driver at the timing at which the presentation condition is satisfied. Specifically, the control device 190 refers to the table illustrated in FIG. 2 to acquire the presentation condition of the presentation information to be presented to the driver. Then, the control device 190 determines whether or not the subject vehicle satisfies the presentation condition on the basis of the travel information of the subject vehicle, and presents the presentation information to the driver at the timing at which the presentation condition is satisfied.

For example, in the "scene of catching up with a preceding vehicle," the control device 190 refers to the table illustrated in FIG. 2 to acquire the presentation condition of the presentation information corresponding to the "scene of catching up with a preceding vehicle." In the example illustrated in FIG. 2, the presentation condition corresponding to the presentation information in the "scene of catching up with a preceding vehicle" is set as a condition that "the time-to-contact (TTC) with the preceding vehicle is S1 or less." In this case, the control device 190 calculates the TTC with the preceding vehicle on the basis of the travel information of the subject vehicle, such as a vehicle speed of the preceding vehicle and a vehicle speed of the subject vehicle, and presents the presentation information to the driver at timing T1 at which the TTC becomes the predetermined value S1 or less.

In the present embodiment, the control device 190 can change the presentation condition on the basis of the travel state of the subject vehicle and can thus change the timing of presenting the presentation information. Details of a method of changing the presentation condition will be described later.

Before presenting the presentation information to the driver, the control device 190 determines presentation modes of options included in the presentation information and an option to be initially selected (default option) on the basis of the travel state of the subject vehicle. For example, in the example illustrated in FIG. 3, the control device 190 determines the option of "follow" as the default option from between the two options of "follow" and "overtake" on the basis of the travel state of the subject vehicle and thereby presents the presentation information to the driver in a state in which a frame border indicative of being selected is superposed on the option of "follow," as illustrated in FIG. 3. In the example illustrated in FIG. 3, the control device 190 presents the presentation information while displaying the option of "overtake" in a grayed-out state (changing the display mode of the option of "overtake") so that the driver can easily select the option of "follow." Details of a method of changing the presentation mode of an option and a method of determining the default option will be described later.

When the driver inputs response information via the input device 160 in response to the presentation information presented to the driver, the control device 190 uses the response information acquisition function to acquire the response information, which is input by the driver, from the input device 160. For example, as illustrated in FIG. 3, in the "scene of catching up with a preceding vehicle," the driver is presented with the two options of "follow" and "overtake" as the presentation information. When, in response to this, the driver operates the input device 160 to select the option of "overtake," the control device 190 acquires the response information of "overtake" from the input device 160.

The control device 190 uses the travel control function to control travel of the subject vehicle on the basis of the input information acquired by the response information acquisition function. For example, when acquiring the input information of "overtake" in the "scene of catching up with a preceding vehicle," the control device 190 transmits a command to the drive control device 180 to perform lane change for overtaking the preceding vehicle.

In the present embodiment, when a waiting cancellation condition to be described later is satisfied after the presentation information is presented to the driver, the control device 190 controls travel of the subject vehicle on the basis of the currently-selected option even if the driver does not input the response information. Specifically, the control device 190 refers to the table illustrated in FIG. 2 to determine whether or not the waiting cancellation condition corresponding to the presentation information presented to the driver is satisfied. When the waiting cancellation condition is satisfied, the control device 190 controls travel of the subject vehicle on the basis of the currently-selected option.

For example, in the example illustrated in FIG. 3, the option of "follow" is presented to the driver in a state of being initially selected. After presenting the presentation information to the driver, the control device 190 refers to the table illustrated in FIG. 2 to determine whether or not the waiting cancellation condition that "the TTC with the preceding vehicle is S2 (S2<S1) or less" is satisfied. When the waiting cancellation condition that "the TTC with the preceding vehicle is S2 or less" is satisfied, the control device 190 controls travel of the subject vehicle on the basis of the option of "follow" even if the driver does not select the option of "follow."

Figure 4:
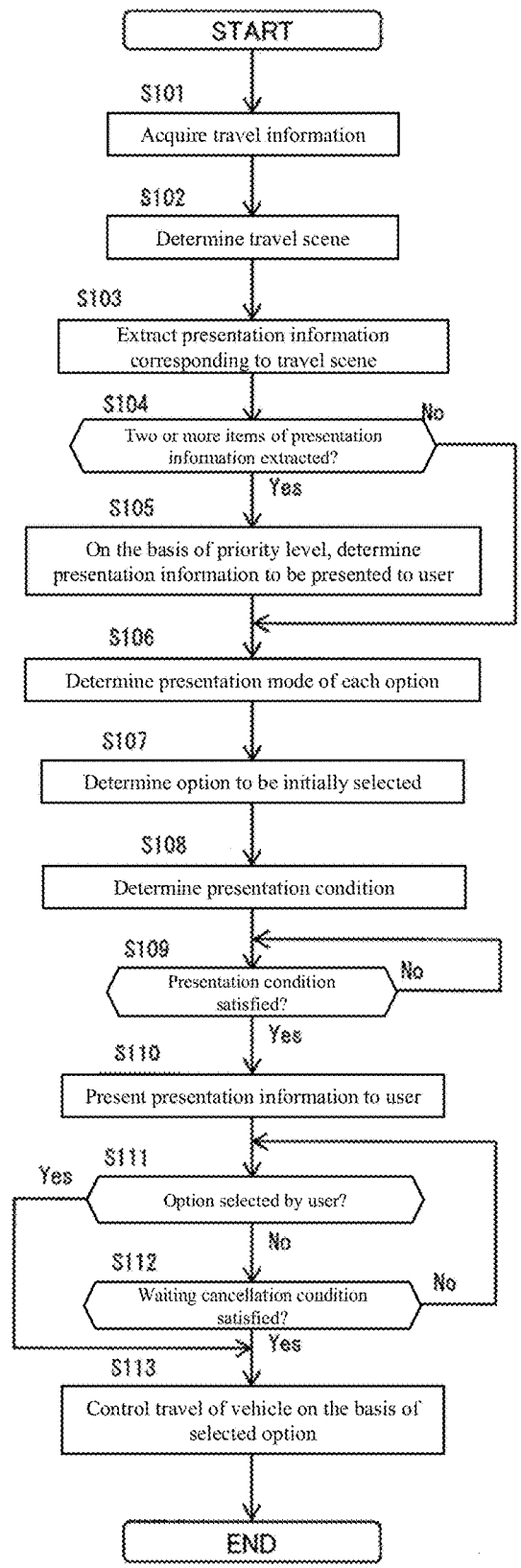
FIG. 4 is a flowchart illustrating a travel control process according to one or more embodiments of the present invention.

A travel control process according to the present embodiment will now be described with reference to FIG. 4. FIG. 4 is a flowchart illustrating the travel control process according to the present embodiment. As will be understood, the travel control process described below is executed by the control device 190.

First, in step S101, the control device 190 uses the travel information acquisition function to acquire the travel information regarding the travel state of the subject vehicle. In step S102, the control device 190 uses the travel scene determination function to determine the travel scene of the subject vehicle on the basis of the travel information acquired in step S101.

In step S103, the control device 190 uses the presentation information determination function to extract the presentation information corresponding to the travel scene determined in step S102. Then, in step S104, the control device 190 uses the presentation information determination function to determine whether or not two or more items of the presentation information are extracted in step S103. When two or more items of the presentation information are extracted, the routine proceeds to step S105 in which the presentation information to be presented to the driver is determined on the basis of the priority level of each item of the presentation information among the two or more items of the presentation information extracted in step S104. The routine then proceeds to step S106. When, in step S104, two or more items of the presentation information are not extracted, the routine proceeds to step S106.

In step S106, the control device 190 uses the presentation function to determine the presentation mode of each option of the presentation information to be presented to the driver. In step S107, the control device 190 uses the presentation function to determine an option to be initially selected (default option) from among a plurality of options included in the presentation information.

In step S108, the control device 190 uses the presentation function to determine a presentation condition for presenting the presentation information. The control device 190 can acquire a presentation condition registered in the table as the presentation condition of the presentation information, as illustrated in FIG. 2, and can also change the acquired presentation information on the basis of the travel information of the subject vehicle. Then, in step S109, the control device 190 uses the presentation function to determine whether or not the presentation condition determined in step S108 is satisfied. When the presentation condition is not satisfied, the routine waits in step S109 until the presentation condition is satisfied. When the presentation condition is satisfied, the routine proceeds to step S110.

In step S110, the control device 190 uses the presentation function to present the presentation information. Specifically, the control device 190 operates the presentation device 150 to present the presentation information extracted in step S103 (when there are two or more items of the extracted presentation information, the presentation information determined in step S105) in the presentation mode of each option determined in step S106 in a state in which the option determined in step S107 is initially selected. The presentation information is thus presented to the driver.

In step S111, the control device 190 uses the travel control function to determine whether or not the driver selects any one of the options using the input device 160 in response to the presentation information presented in step S110. When the driver selects an option, the routine proceeds to step S113 while when the driver does not select an option, the routine proceeds to step S112. Examples of the case in which the driver selects an option include a case in which the driver uses the input device 160 to input the response information of selecting a different option than the default option and a case in which the driver inputs the response information of accepting the default option.

When, in step S111, a determination is made that the driver does not select an option, the routine proceeds to step S112. In step S112, the control device 190 uses the travel control function to determine whether the waiting cancellation condition is satisfied or not. When the waiting cancellation condition is not satisfied, the routine returns to step S111 and repeats the processes of step S111 and S112 until the driver selects an option or the waiting cancellation condition is satisfied. When the waiting cancellation condition is satisfied, the routine proceeds to step S113. In step S113, the control device 190 uses the travel control function to execute control of travel of the subject vehicle on the basis of the selected option of the presentation information.

The operation of the control device 190 in each scene will then be described in detail. First, the operation of the control device 190 in the "scene of catching up with a preceding vehicle" will be described.

For example, the control device 190 acquires the travel information of the subject vehicle (step S101), determines the travel scene of the subject vehicle on the basis of the acquired travel information (step S102), consequently determines a "scene of catching up with a preceding vehicle" (step S102) when satisfying two conditions: a condition of "detecting a preceding vehicle ahead" and a condition of "the vehicle speed of the preceding vehicle<the vehicle speed of the subject vehicle," and acquires the presentation information corresponding to the "scene of catching up with a preceding vehicle" from the ROM (step S103).

Then, the control device 190 determines the presentation mode of each option included in the presentation information on the basis of the travel information of the subject vehicle (step S106). For example, in the example illustrated in FIG. 3, the presentation information corresponding to the "scene of catching up with a preceding vehicle" has options, such as "follow" and "overtake," which the subject vehicle can execute in the "scene of catching up with a preceding vehicle." In this case, the control device 190 can determine the presentation mode of each option in the following manner on the basis of the travel information, such as a driving state of the driver, a travel state of the subject vehicle, a state of a road on which the subject vehicle travels, and an environment around the subject vehicle.

For example, the control device 190 can change the presentation mode of an option, such as "follow" and "overtake," on the basis of a driving load of the driver among the driving states of the driver. When the driving load of the driver falls above a predetermined reference range or falls below the predetermined reference range, for example, the control device 190 can change the presentation mode of each option so that the driver can easily select the option of "follow" as compared with when the driving load of the driver falls within the predetermined reference range.

The control device 190 can determine that the driving load of the driver is high, for example, when the driver operates the onboard equipment 140, such as an air conditioner and car audio, and/or when the driver performs hands-free communication. In addition or alternatively, the control device 190 can determine that the driving load of the driver is low, for example, as the travel time increases when singly driving the subject vehicle.

In addition or alternatively, the control device 190 can change the presentation mode of an option, such as "follow" and "overtake," on the basis of a travel history of the driver among the travel states of the subject vehicle. For example, the control device 190 determines a tendency of the driver in driving on the basis of the travel history of the driver and, when the driver tends not to perform overtaking, the control device 190 can change the presentation mode of each option so that the driver can easily select the option of "follow" as compared with when the driver tends to perform overtaking.

In addition or alternatively, the control device 190 can change the presentation mode of an option, such as "follow" and "overtake," on the basis of a route to a destination among the travel states of the subject vehicle. For example, when the direction in which the subject vehicle changes lanes upon selection of the option of "overtake" is a direction of deviating from the route to the destination, the control device 190 can change the presentation mode of each option so that the driver cannot easily select the option of "overtake." When the subject vehicle is to turn left at the next branching point to head to the destination, but nevertheless will change lanes to the right-side lane for overtaking, for example, the direction in which the subject vehicle changes lanes is a direction of deviating from the route to the destination. The control device 190 can therefore change the presentation mode of each option so that the driver cannot easily select the option of "overtake."

In addition or alternatively, the control device 190 can change the presentation mode of an option, such as "follow" and "overtake," on the basis of a vehicle speed of the subject vehicle among the travel states of the subject vehicle. For example, when the vehicle speed of the subject vehicle is lower than those of peripheral vehicles, the peripheral vehicles are traveling around the subject vehicle at a high speed and it is highly possible that the subject vehicle cannot find a space necessary for lane change. The control device 190 can therefore change the presentation mode of each option so that the driver can easily select the option of "follow."

In addition or alternatively, the control device 190 can change the presentation mode of an option, such as "follow" and "overtake," on the basis of a set vehicle speed of the subject vehicle among the travel states of the subject vehicle. For example, provided that the travel speed of the subject vehicle which automatically follows a preceding vehicle can be selected from among three set speeds of a "low speed," "middle speed," and "high speed," when the set speed is lower than the vehicle speed of the preceding vehicle, the control device 190 can change the presentation mode of each option so that the driver can easily select the option of "follow." This is because, when the set speed is lower than the vehicle speed of the preceding vehicle, it is estimated that the overtaking requires a long time.

In addition or alternatively, the control device 190 can change the presentation mode of an option, such as "follow" and "overtake," on the basis of a congestion degree of a road on which the subject vehicle travels, among the states of the road. For example, when the congestion degree of the road is a predetermined value or higher, the control device 190 can change the presentation mode of each option so that the driver can easily select the option of "follow" as compared with when the congestion degree of the road is lower than the predetermined value. This is because, on a road of a high congestion degree, other vehicles are traveling around the subject vehicle and it is highly possible that the subject vehicle cannot find a space necessary for lane change.

In addition or alternatively, the control device 190 can change the presentation mode of an option, such as "follow" and "overtake," on the basis of the number of lanes of a road on which the subject vehicle travels, among the states of the road. For example, when the number of lanes of the road on which the subject vehicle travels is smaller than a predetermined number, the control device 190 can change the presentation mode of each option so that the driver can easily select the option of "follow" as compared with when the number of lanes of the road on which the subject vehicle travels is not smaller than the predetermined number. This is because, if the number of vehicles of the traffic is the same, other vehicles traveling on a road having a large number of lanes are scattered in the lanes and it is expected that a space for lane change can easily be found, but on a road having a small number of lanes, other vehicles are traveling in a queue and it is considered that a space for lane change may be difficult to find and accordingly the opportunities of overtaking the preceding vehicles decrease.

In addition or alternatively, the control device 190 can change the presentation mode of an option, such as "follow" and "overtake," on the basis of the type of a road on which the subject vehicle travels, among the states of the road. For example, when the road on which the subject vehicle travels is a regional arterial road, the control device 190 can change the presentation mode of each option so that the driver can easily select the option of "follow" as compared with when the road is a highway. This is because the scale of an arterial road is generally smaller than that of a highway and it is thus considered that the opportunities of overtaking decrease.

In addition or alternatively, the control device 190 can change the presentation mode of an option, such as "follow" and "overtake," on the basis of the shape of a road on which the subject vehicle travels, among the states of the road. For example, when the shape of the road on which the subject vehicle travels is a curve, the control device 190 can change the presentation mode of each option so that the driver can easily select the option of "follow" as compared with when the shape of the road is a straight line.

In addition or alternatively, the control device 190 can change the presentation mode of an option, such as "follow" and "overtake," on the basis of a road regulation and/or traffic sign among the states of a road on which the subject vehicle travels. For example, the control device 190 can change the presentation mode of each option so that the driver cannot easily select the option of "overtake" in a no-overtaking zone. When the traveling lane of the subject vehicle is a rightmost or leftmost lane of the road, the subject vehicle may not travel outside the lane. The control device 190 can therefore change the presentation mode of each option so that the driver cannot easily select the option of "overtake."

In addition or alternatively, the control device 190 can change the presentation mode of an option, such as "follow" and "overtake," on the basis of the weather among the environments around the subject vehicle. For example, when it rains, the control device 190 can change the presentation mode of each option so that the driver can easily select the option of "follow." This is because rain causes poor visibility and it is therefore expected that the driver may feel more secure when following a preceding vehicle.

In addition or alternatively, the control device 190 can change the presentation mode of an option, such as "follow" and "overtake," on the basis of the time among the environments around the subject vehicle. For example, the control device 190 can change the presentation mode of each option in the nighttime so that the driver can easily select the option of "follow." This is because the visibility is poor in the nighttime and the driver may therefore feel more secure when following a preceding vehicle.

Thus, the control device 190 can determine the presentation mode of each option, such as "follow" and "overtake," which the subject vehicle can execute in the "scene of catching up with a preceding vehicle," on the basis of the travel state, such as a driving state of the driver, a travel state of the subject vehicle, a state of a road on which the subject vehicle travels, and an environment around the subject vehicle.

The method of changing the presentation mode of an option is not particularly limited. For example, the control device 190 can change the presentation mode of an option so that the driver can easily select the option, such as by blinking the option, changing the option into a more prominent color and/or shade, enlarging the display size of the option, and arranging the option at a position at which it can easily be selected by the driver. The control device 190 can also change the presentation mode of an option so that the driver cannot easily select the option, such as by displaying the option in a grayed-out state, as illustrated in FIG. 3. In addition or alternatively, the control device 190 can make it easy to select one of a plurality of options thereby to put other options into a state of being relatively difficult to select. Conversely, the control device 190 can make it difficult to select one of a plurality of options thereby to put other options into a state of being relatively easy to select. For other presentation information, the presentation mode of each option can be changed in a similar manner so that the driver can easily select the option (or cannot easily select the option).

Description will then be explained to a method of determining an option to be initially selected (default option) from among a plurality of options, such as "follow" and "overtake," which the subject vehicle can execute in the "scene of catching up with a preceding vehicle." The control device 190 determines the default option from among options, such as "follow" and "overtake," on the basis of the travel state, such as a driving state of the driver, a travel state of the subject vehicle, a state of a road on which the subject vehicle travels, and an environment around the subject vehicle (step S107).

Specifically, the control device 190 can determine the default option from among options, such as "follow" and "overtake," on the basis of a driving load of the driver among the driving states of the driver. For example, when the driving load of the driver falls above a predetermined reference range or falls below the predetermined reference range, the control device 190 can determine the option of "follow" as the default option. This is because, when the driving load of the driver falls above the predetermined reference range or falls below the predetermined reference range, the option of "follow" can be selected thereby to allow the driver to feel more secure.

In addition or alternatively, the control device 190 can determine the default option from among options, such as "follow" and "overtake," on the basis of an overtaking history of the driver among the travel states of the subject vehicle. For example, when the driver frequently selects the option of "overtake" in the drive during the past one hour, it can be considered that the driver hurries. In such a case, the control device 190 can determine the option of "overtake" as the default option.

In addition or alternatively, the control device 190 can determine the default option from among options, such as "follow" and "overtake," on the basis of a route to a destination among the travel states of the subject vehicle. For example, when the subject vehicle has to turn right at the next branching point to head to the destination, the subject vehicle can change lanes to the right-side lane to overtake the preceding vehicle and thereafter turn right from that lane at the branching point to head to the destination. In such a case, the control device 190 can determine the option of "overtake" as the default option.

In addition or alternatively, the control device 190 can determine the default option from among options, such as "follow" and "overtake," on the basis of a vehicle speed of the subject vehicle among the travel states of the subject vehicle. For example, when the vehicle speed of the subject vehicle is a predetermined speed or higher, the control device 190 can determine the option of "overtake" as the default option. When the vehicle speed of the subject vehicle is high, the subject vehicle catches up with the preceding vehicle sooner or later. When approaching the preceding vehicle, therefore, the subject vehicle has to brake to decelerate. Thus, the option of "overtake" can be set as the default option thereby to prompt the driver to change lanes early.

In addition or alternatively, the control device 190 can determine the default option from among options, such as "follow" and "overtake," on the basis of a congestion degree of a road on which the subject vehicle travels, among the states of the road. For example, when the congestion degree of the road on which the subject vehicle travels is a predetermined value or lower, the control device 190 can determine the option of "overtake" as the default option. This is because lane change is easy on the road which is not so crowded.

In addition or alternatively, the control device 190 can determine the default option from among options, such as "follow" and "overtake," on the basis of a traveling lane in which the subject vehicle is traveling, among the states of a road on which the subject vehicle travels. For example, when the traveling lane of the subject vehicle is an overtaking lane, overtaking is already planned. The control device 190 can therefore determine the option of "overtake" as the default option.

In addition or alternatively, the control device 190 can determine the default option from among options, such as "follow" and "overtake," on the basis of the type of a traveling road on which the subject vehicle is traveling, among the states of the road. For example, when the type of the traveling road of the subject vehicle is a relatively large-scale road (such as an arterial road and highway), the control device 190 can determine the option of "overtake" as the default option. This is because lane change is relatively easy on a relatively large-scale road.

In addition or alternatively, the control device 190 can determine the default option from among options, such as "follow" and "overtake," on the basis of the shape of a road on which the subject vehicle is traveling, among the states of the road. For example, when the shape of the road on which the subject vehicle is traveling is a curve, it can be expected that the driver takes advantage of the outer edge part of the curve to perform overtaking. Accordingly, provided that the presentation information has an option of "change lanes to the right to overtake," when the curve has an outer edge part at the right side, for example, the control device 190 can determine the option of "change lanes to the right to overtake" as the default option.

In addition or alternatively, the control device 190 can determine the default option from among options, such as "follow" and "overtake," on the basis of the number of lanes of a road on which the subject vehicle is traveling, among the states of the road. For example, when the number of lanes of a road on which the subject vehicle is traveling is a predetermined number or larger, other vehicles traveling on the road may be scattered in the lanes and it is thus considered that lane change is easier than when the number of lanes is smaller than the predetermined number, provided that the traffic of vehicles is the same. The control device 190 can therefore determine the option of "overtake" as the default option.

In addition or alternatively, the control device 190 can determine the default option from among options, such as "follow" and "overtake," on the basis of the weather among the environments around the subject vehicle. For example, when it rains, the driver may not prefer to change lanes because the visibility is poorer than that in fine weather. When it rains, therefore, the control device 190 can determine the option of "follow" as the default option.

In addition or alternatively, the control device 190 can determine the default option from among options, such as "follow" and "overtake," on the basis of the time among the environments around the subject vehicle. For example, the visibility in the nighttime is poorer than the nighttime in the daytime, so the driver may not prefer to change lanes in the nighttime. In the nighttime, therefore, the control device 190 can determine the option of "follow" as the default option.

Thus, in the "scene of catching up with a preceding vehicle," the control device 190 can determine the default option to be initially selected from among a plurality of options, such as "follow" and "overtake," which the subject vehicle can execute, on the basis of the travel state, such as a driving state of the driver, a travel state of the subject vehicle, a state of a road on which the subject vehicle travels, and an environment around the subject vehicle.

Description will then be explained to a method of determining the presentation condition in the "scene of catching up with a preceding vehicle." The control device 190 refers to the table illustrated in FIG. 2 to acquire the presentation condition of the presentation information in the "scene of catching up with a preceding vehicle." For example, in the example illustrated in FIG. 2, the control device 190 acquires a condition that "the TTC with the preceding vehicle is S1 or less" as the presentation condition of the presentation information in the "scene of catching up with a preceding vehicle." Further, the control device 190 changes the acquired presentation condition on the basis of the travel state, such as a driving state of the driver, a travel state of the subject vehicle, a state of a road on which the subject vehicle travels, and an environment around the subject vehicle (step S108).

For example, the control device 190 can change the presentation condition in accordance with a driving load of the driver among the driving states of the driver. When the driving load of the driver falls above a predetermined reference range, for example, the control device 190 can change the presentation condition so that the presentation information is presented at earlier timing as compared with when the driving load of the driver falls within the predetermined reference range. In this case, for example, the control device 190 can change the presentation condition that "the TTC with the preceding vehicle is S1 or less" to a presentation condition that "the TTC with the preceding vehicle is S1' (S1<S1') or less." When the driving load of the driver falls above the predetermined reference range, there may be many objects to pay attention and a long period of time may be required for determination of overtaking. For this reason, the presentation information is presented early thereby to allow the driver to stay on the safe side and feel more secure. Also when the driving load of the driver falls below the predetermined reference range, the control device 190 can change the presentation condition so that the presentation information is presented at earlier timing as compared with when the driving load of the driver falls within the predetermined reference range. When the driving load of the driver falls below the predetermined reference range, the driver may concentrate on one thing and require a long period of time to take notice of the presentation information, so the presentation information is presented early thereby to allow the driver to feel more secure.

In addition or alternatively, the control device 190 can change the presentation condition on the basis of a travel history of the driver among the travel states of the subject vehicle. For example, when the number of times of overtaking preceding vehicles by the subject vehicle is larger than a predetermined reference value during a predetermined period of time before the current time, it is considered that the driver hurries. The presentation condition can therefore be changed so that the presentation information is presented at earlier timing.

In addition or alternatively, the control device 190 can change the presentation condition on the basis of a distance to a destination among the travel states of the subject vehicle. For example, when the distance to the destination is a predetermined distance or more, the control device 190 can change the presentation condition so that the presentation information is presented at earlier timing. This is because, when the distance to the destination is the predetermined distance or more, the presentation condition can be presented early thereby to mitigate the burden of the drive due to such a long distance to the destination.

In addition or alternatively, the control device 190 can change the presentation condition on the basis of a vehicle speed of the subject vehicle among the travel states of the subject vehicle. For example, when the vehicle speed of the subject vehicle is higher than the vehicle speed of peripheral vehicles, the control device 190 can change the presentation condition so that the presentation information is presented at earlier timing. When the vehicle speed of the subject vehicle is high, it is considered that the driver hurries, and the number of spaces for changing lanes increases. In such a case, therefore, the presentation information can be presented at earlier timing thereby to respond to the driver's intention of hurrying to overtake.

In addition or alternatively, the control device 190 can change the presentation condition on the basis of a relative speed to a preceding vehicle among the travel states of the subject vehicle. For example, when the relative speed to the preceding vehicle is a predetermined speed or higher, the control device 190 can change the presentation condition so that the presentation information is presented at earlier timing. When the relative speed of the subject vehicle to the preceding vehicle is high, the presentation information is presented at earlier timing and the subject vehicle can thereby change lanes at earlier timing accordingly. As a result, the driver can feel more secure to the preceding vehicle.

In addition or alternatively, the control device 190 can change the presentation condition on the basis of a congestion degree of a road on which the subject vehicle travels, among the states of the road. For example, when the congestion degree is a predetermined value or higher, the control device 190 can change the presentation condition so that the presentation information is presented at earlier timing. This allows the driver to stay on the safe side and feel more secure even when the road is crowded.

In addition or alternatively, the control device 190 can change the presentation condition on the basis of a traveling lane in which the subject vehicle travels, among the states of a road on which the subject vehicle travels. For example, when there is the road including a regular lane and an overtaking lane and the subject vehicle is traveling in the regular lane, the control device 190 can change the presentation condition so that the presentation information is presented at earlier timing as compared with when the subject vehicle is traveling in the overtaking lane. This is because, in the regular lane, it is highly possible that the preceding vehicle is traveling at a lower speed than a speed in the overtaking lane, and the presentation information can be presented early thereby to respond to the driver's intention of hurrying.

In addition or alternatively, the control device 190 can change the presentation condition on the basis of the type of a road on which the subject vehicle travels, among the states of the road. For example, on a relatively large-scale road (such as an arterial road and highway), the control device 190 can change the presentation condition so that the presentation information is presented at earlier timing than on a relatively small-scale road (such as a minor street and general road). Here, provided that the traffic of vehicles is the same, other vehicles may be scattered when traveling on a relatively large-scale road as compared with when traveling on a relatively small-scale road and, therefore, the degree of freedom of lane change appears to be high. When the subject vehicle travels on a relatively large-scale road, therefore, the presentation information can be presented at earlier timing thereby to allow the user to perform overtaking while staying on the safe side. Similarly, when the number of lanes of a road on which the subject vehicle travels is a predetermined number or larger, the control device 190 can change the presentation condition so that the presentation information is presented at earlier timing.

In addition or alternatively, the control device 190 can change the presentation condition on the basis of the shape of a road on which the subject vehicle travels, among the states of the road. For example, when the shape of the road on which the subject vehicle travels is a curve, the control device 190 can change the presentation condition so that the presentation information is presented at earlier timing as compared with when the shape of the road is a straight line. This is because, when the shape of the road on which the subject vehicle travels is a curve, it is highly possible that the driver more concentrates on the driving as compared with when the shape of the road is a straight line, and selection of an option may require a longer time accordingly.

In addition or alternatively, the control device 190 can changes the presentation condition on the basis of the width of a traveling lane of the subject vehicle, among the states of a road on which the subject vehicle travels. For example, when the width of the traveling lane of the subject vehicle is a predetermined distance or more, the control device 190 can change the presentation condition so that the presentation information is presented at earlier timing as compared with when the width of the traveling lane of the subject vehicle is less than the predetermined distance. This is because lane change may require a longer time when the width of the traveling lane of the subject vehicle is the predetermined distance or more as compared with when the width of the traveling lane of the subject vehicle is less than the predetermined distance, provided that the transverse speed is the same.

In addition or alternatively, the control device 190 can change the presentation condition on the basis of the weather among the environments around the subject vehicle. For example, the control device 190 can change the presentation condition in the event of rain so that the presentation information is presented at earlier timing than in fine weather. When it rains, the driver may attempt more careful driving than in fine weather. The control device 190 can therefore present the presentation information early thereby to allow the driver to feel more secure.

In addition or alternatively, the control device 190 can change the presentation condition on the basis of the current time among the environments around the subject vehicle. For example, in the nighttime, the control device 190 can present the presentation information at earlier timing. In a dark environment during the nighttime, the control device 190 can present the presentation information at earlier timing thereby to allow the driver to stay on the safe side and feel more secure.

Thus, in the "scene of catching up with a preceding vehicle," the control device 190 can determine the presentation information on the basis of the travel state, such as a driving state of the driver, a travel state of the subject vehicle, a state of a road on which the subject vehicle travels, and an environment around the subject vehicle.

After the presentation condition is determined, the control device 190 determines whether or not the determined presentation condition is satisfied (step S108). When the presentation condition is satisfied, the control device 190 presents the presentation information to the driver in the above-described presentation mode of an option in a state in which the above-described default option is selected (step S109). Then, when the driver inputs response information in response to the presentation information (step S111=Yes), the control device 190 controls travel of the subject vehicle on the basis of the option selected by the driver (step S113).

When the driver does not input response information, the control device 190 determines whether the waiting cancellation condition is satisfied (step S112). For example, in the example illustrated in FIG. 2, the waiting cancellation condition in the "scene of catching up with a preceding vehicle" is a condition that "the TTC with the preceding vehicle is S2 (S1>S2) or less." In this case, the control device 190 determines whether or not the subject vehicle satisfies the waiting cancellation condition that "the TTC with the preceding vehicle is S2 (S1>S2) or less." When the condition that "the TTC with the preceding vehicle is S2 (S1>S2) or less" is satisfied, the control device 190 controls travel of the subject vehicle on the basis of the default option (step S113).

The control device 190 operates in this manner in the "scene of catching up with a preceding vehicle."

Figure 5:
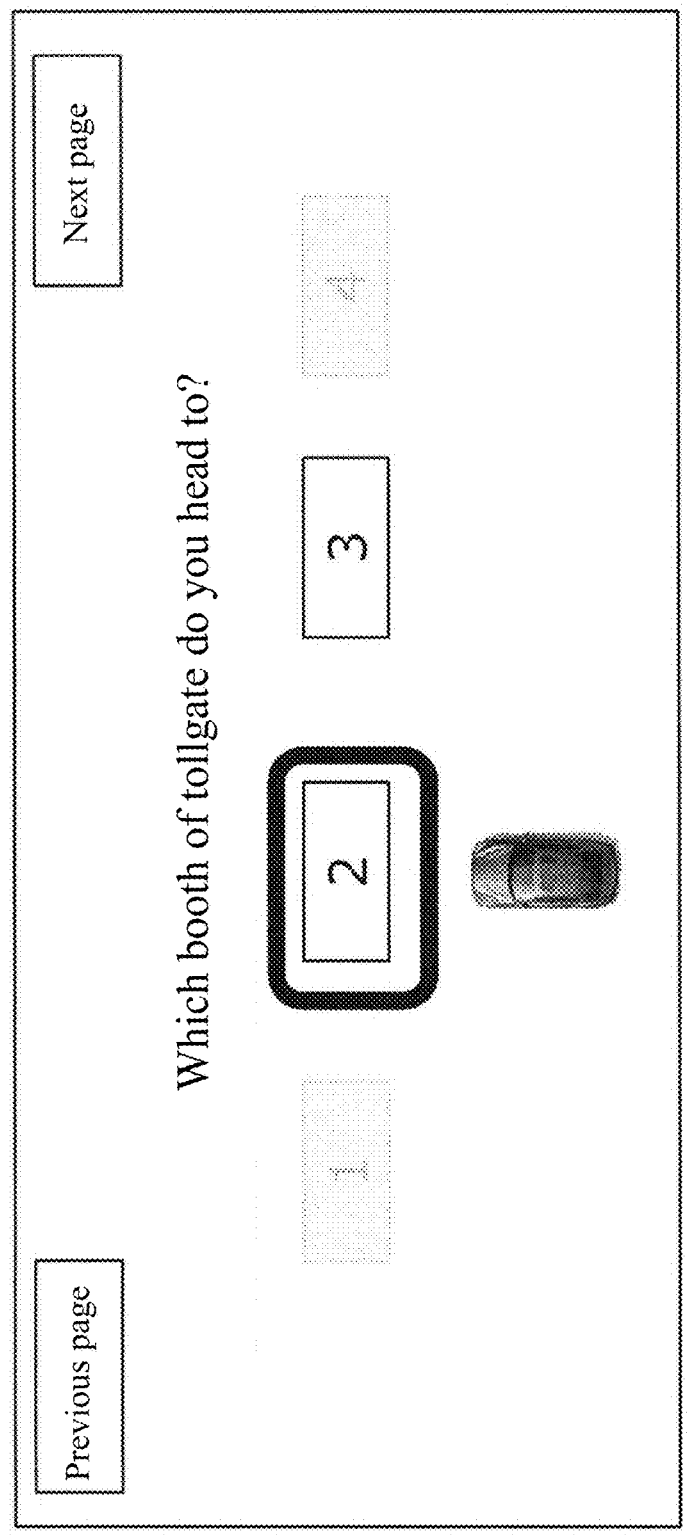
FIG. 5 is a view illustrating an example of presentation information presented by a presentation device in a scene of approaching a tollgate.

Next, the operation of the control device 190 in a "scene of approaching a tollgate" will be described. For example, in the example illustrated in FIG. 2, the control device 190 determines whether or not the subject vehicle satisfies a determination condition that "the time for arriving at a tollgate located ahead is within 60 seconds," on the basis of the travel information of the subject vehicle. When the determination condition is satisfied, the control device 190 determines that the travel scene is the "scene of approaching a tollgate" (step S102) and the control device 190 acquires the presentation information corresponding to the "scene of approaching a tollgate" from the ROM (step S103). FIG. 5 is a view illustrating an example of the presentation information which is displayed on the screen of a display as the presentation device 150 in the "scene of approaching a tollgate."

Then, the control device 190 determines the presentation mode of each option included in the presentation information on the basis of the travel information of the subject vehicle (step S106). For example, in the example illustrated in FIG. 5, the presentation information corresponding to the "scene of approaching a tollgate" has message information such as "Which booth of the tollgate do you head to?" together with options, such as "1," "2," "3," and "4," corresponding to respective booths of the tollgate which the subject vehicle can enter in the "scene of approaching a tollgate." In this case, the control device 190 can determine the presentation mode of each option in the following manner on the basis of the travel information, such as a driving state of the driver, a travel state of the subject vehicle, a state of a road on which the subject vehicle travels, and an environment around the subject vehicle.

For example, the control device 190 can determine the presentation mode of an option corresponding to each booth on the basis of a driving load of the driver among the driving states of the driver. When the driving load of the driver falls above a predetermined reference range or falls below the predetermined reference range, for example, the control device 190 can change the presentation mode of an option corresponding to each booth so that the driver can easily select an option corresponding to a booth close to the traveling lane of the subject vehicle (e.g. a booth of which the distance from the traveling lane of the subject vehicle is not longer than a predetermined distance), as compared with when the driving load of the driver falls within the predetermined reference range. This is because, when the driving load of the driver falls above the predetermined reference range or falls below the predetermined reference range, the driver can easily select an option which the driver highly possibly select, thereby to allow the driver to stay on the safe side and feel more secure accordingly.

In addition or alternatively, the control device 190 can change the presentation mode of an option corresponding to each booth on the basis of a travel history of the driver among the travel states of the subject vehicle. For example, the control device 190 can specify a booth which the driver does not frequently utilize (such as booths disposed at both ends of the tollgate) on the basis of the travel history of the driver thereby to change the presentation mode of each option so that the driver cannot easily select an option corresponding to the booth which the driver is less likely to utilize.

In addition or alternatively, the control device 190 can determine the presentation mode of an option corresponding to each booth on the basis of a direction toward a destination among the travel states of the subject vehicle. For example, the control device 190 can change the presentation mode of an option corresponding to each booth so that the driver cannot easily select an option corresponding to the booth, among the booths of the tollgate, which is located at a position separate from the route to the destination. When the subject vehicle heading to the destination is planned to travel on a road that is branched to the right after passing through the tollgate, for example, the control device 190 can change the presentation mode of each option so that the driver cannot easily select an option corresponding to the booth, among the booths of the tollgate, which is disposed at the left side from the middle.

In addition or alternatively, the control device 190 can change the presentation mode of an option corresponding to each booth in accordance with a vehicle speed of the subject vehicle among the travel states of the subject vehicle. For example, when the vehicle speed of the subject vehicle is lower than the vehicle speed of peripheral vehicles, the subject vehicle may arrive at a booth of the tollgate later than the peripheral vehicles and the driving load of the driver may thus be high because the situation around the booths is changed from moment to moment by the peripheral vehicles which enter the booths earlier than the subject vehicle. In such a case, therefore, the control device 190 can change the presentation mode of each option so that the driver can easily select an option corresponding to the booth which is close to the route for the subject vehicle. This allows the driver to concentrate on the driving.

In addition or alternatively, the control device 190 can change the presentation mode of an option corresponding to each booth on the basis of a congestion degree around the booths among the states of a road on which the subject vehicle travels. For example, the control device 190 can change the presentation mode of each option so that the driver can easily select an option corresponding to the booth of which the congestion degree is lower than a predetermined value. This is because the use of such a booth of a low congestion degree allows the driver to stay on the safe side and feel more secure.

In addition or alternatively, the control device 190 can change the presentation mode of an option corresponding to each booth on the basis of the number of booths in the tollgate among the states of a road on which the subject vehicle travels. For example, when the number of booths is a predetermined number or larger, the control device 190 can change the presentation mode of each option so that the driver cannot easily select a booth separate from the middle. This allows the driver to easily select a booth even when the number of booths of the tollgate is large.

In addition or alternatively, the control device 190 can change the presentation mode of an option corresponding to each booth on the basis of the type of a road on which the subject vehicle travels, among the states of the road. For example, when the scale of the road on which the subject vehicle travels is relatively large, the number of booths is also large. The control device 190 can therefore change the presentation mode of each option so that the driver cannot easily select an option corresponding to the booth which departs from the route for the subject vehicle. This can narrow down the options to those which the driver can easily select, thereby to mitigate the driver's ambivalence as to which option the driver should select, The number of options to be selected by the driver is limited so as to mitigate the driver's ambivalence even when the number of booths of the tollgate is large. The driver can thus feel more secure.

In addition or alternatively, the control device 190 can change the presentation mode of an option corresponding to each booth on the basis of the shape of a road on which the subject vehicle travels, among the states of the road. For example, when the shape of the road on which the subject vehicle travels is a curve, the control device 190 can change the presentation mode of each option so that the driver cannot easily select an option corresponding to the booth which departs from the route for the subject vehicle, as compared with when the shape of the road is a straight line. This is because, when the shape of the road is a curve, it is highly possible that the driver more concentrates on the driving as compared with when the shape of the road is a straight line, and selection of an option may require a longer time accordingly.

In addition or alternatively, the control device 190 can change the presentation mode of an option corresponding to each booth on the basis of the weather among the environments around the subject vehicle. For example, when it rains, the control device 190 can change the presentation mode of each option so that the driver can easily select an option corresponding to the booth which is close to the route for the subject vehicle. This is because rain causes poor visibility and the driver can therefore feel secure when some booths which the subject vehicle can relatively readily enter are made easy for the driver to select.

In addition or alternatively, the control device 190 can change the presentation mode of an option corresponding to each booth on the basis of the time among the environments around the subject vehicle. For example, the control device 190 can change the presentation mode of each option in the nighttime so that the driver can easily select an option corresponding to the booth which is close to the route for the subject vehicle. This is because the visibility is poor in the nighttime and the driver can therefore feel secure when some booths which the subject vehicle can relatively readily enter are made easy for the driver to select.

Thus, the control device 190 can determine the presentation mode of an option corresponding to each booth of the tollgate which the subject vehicle can enter in the "scene of approaching a tollgate" on the basis of the travel state, such as a driving state of the driver, a travel state of the subject vehicle, a state of a road on which the subject vehicle travels, and an environment around the subject vehicle.

Description will then be explained to a method of determining an option to be initially selected (default option) from among options corresponding to respective booths of the tollgate which the subject vehicle can enter in the "scene of approaching a tollgate." The control device 190 determines the default option from among options corresponding to respective booths on the basis of the travel state, such as a driving state of the driver, a travel state of the subject vehicle, a state of a road on which the subject vehicle travels, and an environment around the subject vehicle (step S107).

Specifically, the control device 190 can determine the default option from among options corresponding to respective booths on the basis of a driving load of the driver among the driving states of the driver. For example, when the driving load of the driver falls above a predetermined reference range or falls below the predetermined reference range, the control device 190 can determine an option corresponding to the booth which is closest to the route for the subject vehicle, as the default option.

In addition or alternatively, the control device 190 can determine the default option from among options corresponding to respective booths on the basis of a utilization history of booths among the travel states of the subject vehicle. For example, the control device 190 obtains the utilization frequency of each booth on the basis of the utilization history of booths and the control device 190 can determine an option corresponding to the booth which the driver most frequently utilizes, as the default option. When the driver utilizes the tollgate on the way to work, for example, the booth which the driver most frequently utilizes can be selected as the default option thereby to enhance the convenience for the driver.

In addition or alternatively, the control device 190 can determine the default option from among options corresponding to respective booths on the basis of a route to a destination among the travel states of the subject vehicle. For example, when the subject vehicle heading to the destination has to travel on a route that is branched to the right after passing through the tollgate, for example, the control device 190 can determine an option corresponding to the booth which is disposed at the right side from the middle, as the default option. This allows the driver to easily head to the destination after passing through the toll gate and feel more secure.

In addition or alternatively, the control device 190 can determine the default option from among options corresponding to respective booths on the basis of a vehicle speed of the subject vehicle among the travel states of the subject vehicle. For example, when the vehicle speed of the subject vehicle is a predetermined speed or higher, the control device 190 can determine an option corresponding to the booth which is closest to the route for the subject vehicle, as the default option. The reason of this is as follows. Provided that the vehicle speed of the subject vehicle is high, when heading to a booth separate from the route for the subject vehicle, the subject vehicle may have to perform some operation such as deceleration, whereas when entering a booth close to the route for the subject vehicle, the operation may be relatively easy and the driver can thus feel secure.

In addition or alternatively, the control device 190 can determine the default option from among options corresponding to respective booths on the basis of a congestion degree around the booths among the states of a road on which the subject vehicle travels. For example, the control device 190 can determine an option corresponding to the booth of which the congestion degree is a predetermined value or lower, as the default option. In one or more embodiments, the control device 190 can determine the congestion degree around the booths through using the front camera to capture images of an electronic signboard that indicates the situation and/or congestion degree around the booths and performing image processing. In one or more embodiments, the control device 190 can determine the congestion degree around the booths on the basis of information which the communication device 170 receives via road-to-vehicle communication and which represents the congestion degree around the booths. In one or more embodiments, the control device 190 can determine the congestion degree around the booths through measuring the speed of other vehicles waiting at the tollgate via vehicle-to-vehicle communication and determining whether other vehicles of low speed are in a queue.

In addition or alternatively, the control device 190 can determine the default option from among options corresponding to respective booths on the basis of a traveling lane in which the subject vehicle travels, among the states of a road on which the subject vehicle travels. For example, the control device 190 can determine an option corresponding to the booth which is closest to the traveling lane of the subject vehicle, as the default option. The subject vehicle can arrive earliest at the booth which is closest to the traveling lane of the subject vehicle, and the driver can therefore feel more secure even when the driver is not good at driving.

In addition or alternatively, the control device 190 can determine the default option from among options corresponding to respective booths on the basis of the type of a road on which the subject vehicle is traveling, among the states of the road. For example, when the type of the road on which the subject vehicle is traveling is a relatively large-scale road (such as an arterial road and highway), the control device 190 can determine an option corresponding to a booth located near the middle of the booths, as the default option. This is because the tollgate of a relatively large-scale road has a number of booths and the driver can easily select a booth when the booth is located at the middle of the booths.

In addition or alternatively, the control device 190 can determine the default option from among options corresponding to respective booths on the basis of the shape of a road on which the subject vehicle is traveling, among the states of the road. For example, when the shape of the road on which the subject vehicle is traveling is a curve, the control device 190 can determine an option corresponding to the booth located at the outer side of the curve as the default option so that the driver can take advantage of the outer edge part of the curve to arrive at the booth. This can mitigate the variation of centrifugal force applied to the driver and the driver can therefore feel improved ride quality.

In addition or alternatively, the control device 190 can determine the default option from among options corresponding to respective booths on the basis of the number of lanes of a road on which the subject vehicle is traveling, among the states of the road. For example, when the number of lanes of the road on which the subject vehicle is traveling is a predetermined number or larger, the control device 190 can determine an option corresponding to a booth located near the middle of the booths, as the default option.

In addition or alternatively, the control device 190 can determine the default option from among options corresponding to respective booths on the basis of the weather among the environments around the subject vehicle. For example, when it rains, the control device 190 can determine an option corresponding to the booth which is closest to the route for the subject vehicle, as the default option. Since rain causes poorer visibility than visibility in fine weather, a booth which the subject vehicle can approach substantially in a straight line to enter can be set as the default thereby to allow the driver to feel more secure. Similarly, in the nighttime, the control device 190 can determine an option corresponding to the booth which is closest to the route for the subject vehicle, as the default option.

Thus, in the "scene of approaching a tollgate," the control device 190 can determine the default option to be initially selected from among a plurality of options corresponding to respective booths which the subject vehicle can enter, on the basis of the travel state, such as a driving state of the driver, a travel state of the subject vehicle, a state of a road on which the subject vehicle travels, and an environment around the subject vehicle.

Description will then be explained to a method of determining the presentation condition in the "scene of approaching a tollgate." The control device 190 refers to the table illustrated in FIG. 2 to acquire the presentation condition of the presentation information in the "scene of approaching a tollgate." For example, in the example illustrated in FIG. 2, the control device 190 acquires a condition that "the time for arriving at a tollgate is S3 or less" as the presentation condition of the presentation information in the "scene of approaching a tollgate." Further, the control device 190 changes the acquired presentation condition on the basis of the travel state, such as a driving state of the driver, a travel state of the subject vehicle, a state of a road on which the subject vehicle travels, and an environment around the subject vehicle (step S108).

Specifically, in the "scene of approaching a tollgate," the control device 190 can change the presentation condition on the basis of the driving load of the driver, the distance to a destination, the lane in which the subject vehicle travels, the shape of a road on which the subject vehicle is traveling, the weather, and the time, as in the "scene of catching up with a preceding vehicle." In addition or alternatively, in the "scene of approaching a tollgate," the control device 190 can change the presentation condition in the following manner.

That is, the control device 190 can determine the presentation condition on the basis of a travel history of the driver among the travel states of the subject vehicle. For example, when the driver does not have much experience in past times in utilizing the tollgate, the control device 190 can change the presentation condition so that the presentation information is presented at earlier timing. This allows the driver to stay on the safe side and feel more secure.

In addition or alternatively, the control device 190 can change the presentation condition on the basis of a vehicle speed of the subject vehicle among the travel states of the subject vehicle. For example, when the vehicle speed of the subject vehicle is higher than the vehicle speed of peripheral vehicles, the subject vehicle can arrive at a booth prior to the peripheral vehicles and, therefore, the possibility that the subject vehicle can select a plurality of booths is high. Such a case increases the driver's burden to select an option corresponding to one booth among a number of booths. The control device 190 therefore changes the presentation condition so that the presentation information is presented at earlier timing. This allows the driver to feel more secure.

In addition or alternatively, the control device 190 can change the presentation condition on the basis of a congestion degree of the tollgate among the states of a road on which the subject vehicle travels. Specifically, when the congestion degree of the tollgate is a predetermined value or higher, the control device 190 can change the presentation condition so that the presentation information is presented at earlier timing. This allows the driver to proceed to a booth while staying on the safe side.

In addition or alternatively, the control device 190 can change the presentation condition on the basis of the type of a road on which the subject vehicle travels, among the states of the road. For example, when the subject vehicle is traveling on a relatively large-scale road (such as an arterial road and highway), the control device 190 can change the presentation condition so that the presentation information is presented at earlier timing than when the subject vehicle is traveling on a relatively small-scale road (such as a minor street and general road). On a relatively large-scale road, the number of booths tends to be large. The control device 190 can therefore present the presentation information at earlier timing thereby to allow the driver to select any one of options while staying on the safe side. Similarly, the control device 190 can change the presentation condition on the basis of the number of lanes of a road on which the subject vehicle travels.

Thus, in the "scene of approaching a tollgate," the control device 190 can determine the presentation condition on the basis of the travel state, such as a driving state of the driver, a travel state of the subject vehicle, a state of a road on which the subject vehicle travels, and an environment around the subject vehicle.

When the subject vehicle satisfies the presentation condition, the control device 190 presents the presentation information to the driver in the above-described presentation mode of an option in a state in which the above-described default option is selected (step S109). Then, when the driver inputs response information in response to the presentation information (step S111=Yes), the control device 190 controls travel of the subject vehicle on the basis of the option which the driver selects (step S113). On the other hand, when the driver does not input response information in the "scene of approaching a tollgate," the control device 190 determines whether or not the subject vehicle satisfies the waiting cancellation condition that "the time for arriving at a tollgate is S4 (S3>S4) or less," for example, as illustrated in FIG. 2. When the waiting cancellation condition is satisfied, the control device 190 controls travel of the subject vehicle on the basis of the default option (step S113).

The control device 190 operates in this manner in the "scene of approaching a tollgate."

Figure 6:
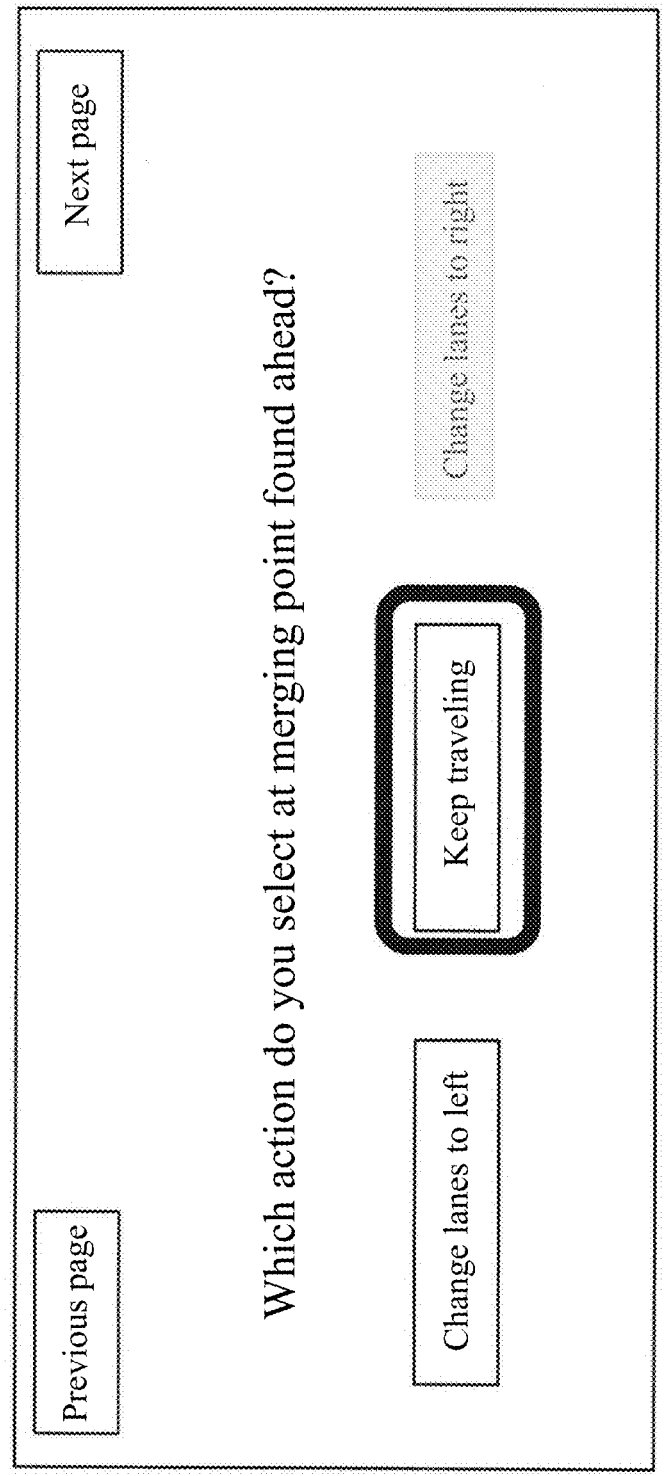
FIG. 6 is a view illustrating an example of presentation information presented by a presentation device in a scene of approaching a merging point.

Next, the operation of the control device 190 in a "scene of approaching a merging point" will be described. For example, in the example illustrated in FIG. 2, the control device 190 determines whether or not the subject vehicle satisfies a determination condition that "the time for arriving at a merging point located ahead is within 60 seconds," on the basis of the travel information of the subject vehicle. When the determination condition is satisfied, the control device 190 determines that the travel scene is the "scene of approaching a merging point" (step S102) and the control device 190 acquires the presentation information corresponding to the "scene of approaching a merging point" (step S103). FIG. 6 is a view illustrating an example of the presentation information which is displayed on the screen of a display as the presentation device 150 in the "scene of approaching a merging point."

Then, the control device 190 determines the presentation mode of each option included in the presentation information on the basis of the travel information of the subject vehicle (step S106). For example, in the example illustrated in FIG. 6, the presentation information corresponding to the "scene of approaching a merging point" includes message information such as "Which action do you select at the merging point found ahead?" together with options, such as "change lanes to the left," "keep traveling," and "change lanes to the right," which the driver can execute in the "scene of approaching a merging point." In this case, the control device 190 can determine the presentation mode of each option on the basis of the travel information, such as a driving state of the driver, a travel state of the subject vehicle, a state of a road on which the subject vehicle travels, and an environment around the subject vehicle.

For example, the control device 190 can change the presentation mode of an option, such as "change lanes to the left," "keep traveling," and "change lanes to the right," on the basis of another vehicle and/or an obstacle existing around the subject vehicle, among the travel states of the subject vehicle. For example, when another vehicle exists at the side of the subject vehicle and/or when an obstacle such as a wall and curbstone exists at the side of the subject vehicle, the control device 190 can change the presentation mode of each option so that the driver cannot easily select an option corresponding to the lane change in the direction in which another vehicle and/or an obstacle exist.

In addition or alternatively, the control device 190 can change the presentation mode of an option, such as "change lanes to the left," "keep traveling," and "change lanes to the right," on the basis of a road regulation and/or traffic sign among the states of a road on which the subject vehicle travels. For example, the control device 190 can change the presentation mode of each option so that the driver cannot easily select the option of "change lanes to the right" in a no-overtaking zone.

Further, the control device 190 determines the default option from among options, such as "change lanes to the left," "keep traveling," and "change lanes to the right," which the driver can execute in the "scene of approaching a merging point," on the basis of the travel state, such as a driving state of the driver, a travel state of the subject vehicle, a state of a road on which the subject vehicle travels, and an environment around the subject vehicle (step S107).

For example, provided that the road on which the subject vehicle travels has a merging lane that merges into another road and a non-merging lane that is adjacent to the merging lane and does not directly merge into another road, when the subject vehicle travels on the merging lane and the non-merging lane is not crowded, the control device 190 can determine an option for changing lanes to the non-merging lane as the default option. This is because such lane change from the merging lane to the non-merging lane reduces the possibility that another vehicle merging from another road comes close to the subject vehicle, and the driver can feel more secure. The control device 190 can otherwise select the option of "keep traveling" as the default option.

Then, the control device 190 determines the presentation condition of the presentation information in the "scene of approaching a merging point" (step S109). For example, in the example illustrated in FIG. 2, the control device 190 acquires a condition that "the time for arriving at a merging point is S5 or less" as the presentation condition of the presentation information in the "scene of approaching a merging point."

When the subject vehicle satisfies the presentation condition, the control device 190 presents the presentation information to the driver in the above-described presentation mode of an option in a state in which the above-described default option is selected (step S109). Then, when the user inputs response information or when the waiting cancellation condition that "the time for arriving at a merging point is S6 (S5>S6) or less" is satisfied, the control device 190 controls travel of the subject vehicle on the basis of the selected option (step S113).

The control device 190 operates in this manner in the "scene of approaching a merging point."

Figure 7:
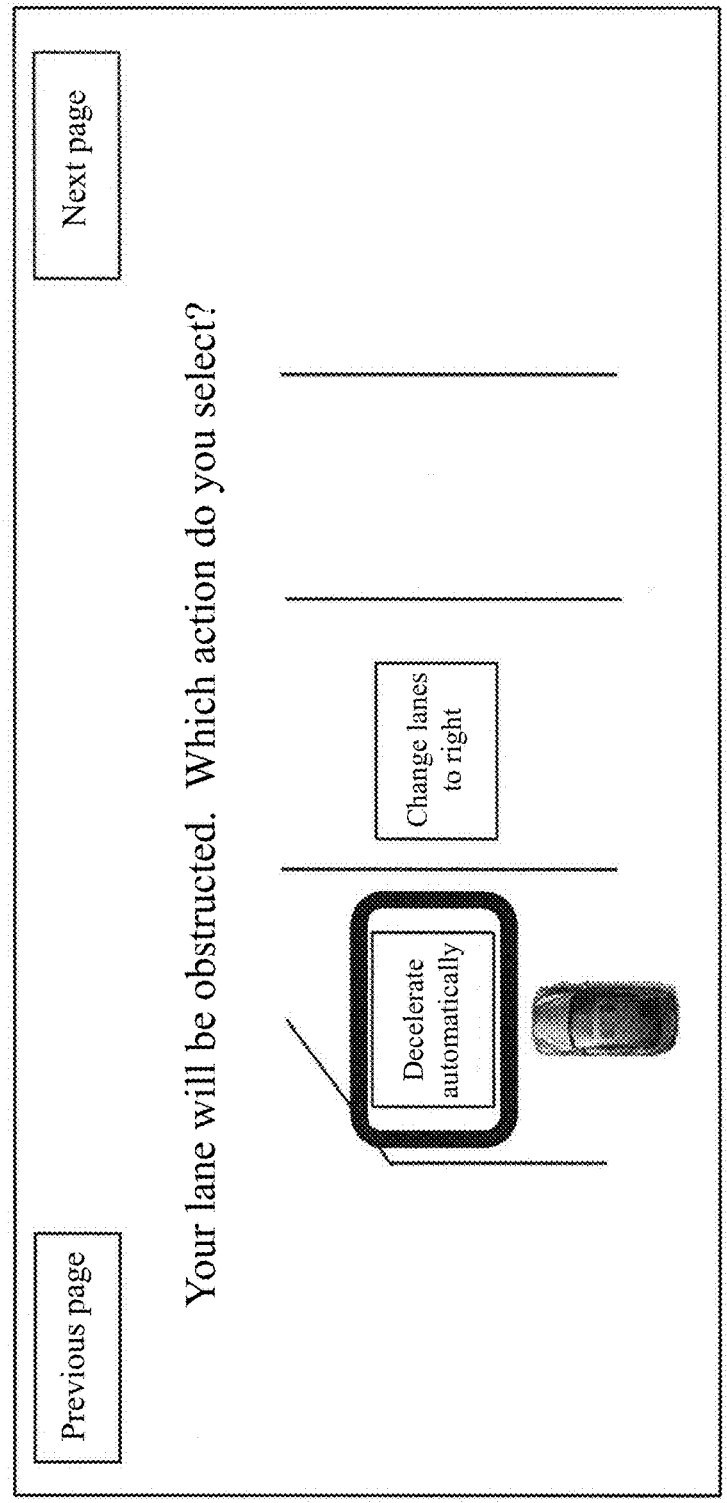
FIG. 7 is a view illustrating an example of presentation information presented by a presentation device in an obstruction scene of the subject vehicle's lane.

Next, the operation of the control device 190 in an "obstruction scene of the subject vehicle's lane" will be described. For example, in the example illustrated in FIG. 2, the control device 190 determines whether or not the subject vehicle satisfies a determination condition that "the traveling lane of the subject vehicle will disappear within a certain distance," on the basis of the travel information of the subject vehicle. When the determination condition is satisfied, the control device 190 determines that the travel scene is the "obstruction scene of the subject vehicle's lane" (step S102) and the control device 190 acquires the presentation information corresponding to the "obstruction scene of the subject vehicle's lane" (step S103). FIG. 7 is a view illustrating an example of the presentation information which is displayed on the screen of a display as the presentation device 150 in the "obstruction scene of the subject vehicle's lane."

Then, the control device 190 determines the presentation mode of each option included in the presentation information on the basis of the travel information of the subject vehicle (step S106). For example, in the example illustrated in FIG. 7, the presentation information corresponding to the "obstruction scene of the subject vehicle's lane" includes message information such as "Do you head to the obstacle in your lane? (Your lane will be obstructed. Which action do you select?)" together with options, such as "decelerate automatically" and "change lanes to the right," which the driver can execute in the "obstruction scene of the subject vehicle's lane." In this case, the control device 190 can determine the presentation mode of each option, such as "decelerate automatically" and "change lanes to the right," in the following manner on the basis of the travel information, such as a driving state of the driver, a travel state of the subject vehicle, a state of a road on which the subject vehicle travels, and an environment around the subject vehicle.

For example, the control device 190 can change the presentation mode of an option, such as "decelerate automatically" and "change lanes," on the basis of a driving load of the driver among the driving states of the driver. When the driving load of the driver falls above a predetermined reference range or falls below the predetermined reference range, for example, the control device 190 can change the presentation mode of each option so that the driver can easily select the option of "decelerate automatically" as compared with when the driving load of the driver falls within the predetermined reference range. Thus, options which the driver can easily select are narrowed down to an option which the driver may highly possibly select, thereby to allow the driver to stay on the safe side and feel more secure.

In addition or alternatively, the control device 190 can determine the presentation mode of an option, such as "decelerate automatically" and "change lanes," on the basis of a travel history of the driver among the travel states of the subject vehicle. For example, the control device 190 specifies whether or not the road on which the subject vehicle travels is a road used by the driver on the way to work on the basis of the travel history of the driver and can change the presentation mode of each option so that, when road repairing continues for a certain period of time on the road used by the driver on the way to work, the driver cannot easily select an option with which the subject vehicle will travel in a lane obstructed due to the road repairing.

In addition or alternatively, the control device 190 can change the presentation mode of an option, such as "decelerate automatically" and "change lanes," on the basis of a route toward a destination among the travel states of the subject vehicle. For example, provided that the subject vehicle has to turn right soon in order to travel on a route toward the destination, when the right lane adjacent to the traveling lane of the subject vehicle is not obstructed, the subject vehicle will change lanes to the right. The control device 190 can therefore change the presentation mode of each option so that the driver can easily select the option of "change lanes to the right."

In addition or alternatively, the control device 190 can change the presentation mode of an option, such as "decelerate automatically" and "change lanes," on the basis of a vehicle speed of the subject vehicle among the travel states of the subject vehicle. For example, when the vehicle speed of the subject vehicle is a predetermined speed or higher, the subject vehicle will arrive early at the obstructed point. The control device 190 can therefore determine the presentation mode of each option so that the driver can easily select the option of "decelerate automatically." This can mitigate the burden of the driver when selecting an option.

In addition or alternatively, the control device 190 can determine the presentation mode of an option, such as "decelerate automatically" and "change lanes," on the basis of the distance to an obstructed point among the travel states of the subject vehicle. For example, when the distance to the obstructed point is a predetermined distance or shorter, the subject vehicle will arrive early at the obstructed point. The control device 190 can therefore determine the presentation mode of each option so that the driver can easily select the option of "decelerate automatically."

In addition or alternatively, when the distance to the obstructed point is short (e.g. 100 m), the control device 190 can change the presentation mode of each option so that the driver can select only the option of "change lanes to the right." In addition or alternatively, when the distance to the obstructed point is long (e.g. 1 km), the control device 190 can change the presentation mode of each option so that the driver can select the option of "decelerate automatically" and the option of "change lanes to the right." For example, if the driver can select only the option of lane change even though the distance to the obstructed point is long, the lane change may cause the subject vehicle to be interposed between trucks. In such a case, the driver can select the option of "decelerate automatically" thereby to appropriately avoid such a dangerous situation.

In addition or alternatively, the control device 190 can change the presentation mode of an option, such as "decelerate automatically" and "change lanes," on the basis of a congestion degree of a road on which the subject vehicle travels, among the states of the road. For example, on a road of which the congestion degree is lower than a predetermined value, the control device 190 can change the presentation mode of each option so that the driver can easily select the option of "change lanes to the right." This is because lane change is relatively easy on a road of which the congestion degree is low.

In addition or alternatively, the control device 190 can change the presentation mode of an option, such as "decelerate automatically" and "change lanes," on the basis of the number of lanes of a road on which the subject vehicle travels, among the states of the road. For example, when the number of lanes is a predetermined number or larger, lane change is relatively easy. The control device 190 can therefore change the presentation mode of each option so that the driver can easily select the option of "change lanes to the right."

In addition or alternatively, the control device 190 can change the presentation mode of an option, such as "decelerate automatically" and "change lanes," on the basis of the shape of a road on which the subject vehicle travels, among the states of the road. For example, when the shape of the road on which the subject vehicle travels is a curve, the control device 190 can change the presentation mode of each option so that the driver can easily select the option of "decelerate automatically" as compared with when the shape of the road is a straight line. In a curve, it is highly possible that the driver more concentrates on the driving than in a straight line. When the option of "decelerate automatically" is easy to select, therefore, the burden of the driver to select an option can be mitigated and the driver can drive while feeling more secure.

In addition or alternatively, the control device 190 can determine the presentation mode of each option, such as "decelerate automatically" and "change lanes," on the basis of the weather and/or time among the environments around the subject vehicle. For example, since rain causes poorer visibility than that in fine weather, it may be preferred to reduce the burden of the driver when selecting an option and allow the driver to concentrate on the driving. In this context, provided that it rains, when the possibility of changing lanes to the right soon is high, for example, the control device 190 can change the presentation mode of each option so that the driver can easily select the option of "change lanes to the right." Similarly, in the nighttime, when the possibility of changing lanes to the right soon is high, the control device 190 can change the presentation mode of each option so that the driver can easily select the option of "change lanes to the right."

Thus, the control device 190 can determine the presentation mode of an option, such as "decelerate automatically" and "change lanes to the right," which the subject vehicle can select in the "obstruction scene of the subject vehicle's lane," on the basis of the travel state, such as a driving state of the driver, a travel state of the subject vehicle, a state of a road on which the subject vehicle travels, and an environment around the subject vehicle.

Description will then be explained to a method of determining an option to be initially selected (default option) from among options, such as "decelerate automatically" and "change lanes to the right," which the subject vehicle can execute in the "obstruction scene of the subject vehicle's lane." The control device 190 determines the default option from among options, such as "decelerate automatically" and "change lanes to the right," on the basis of the travel state, such as a driving state of the driver, a travel state of the subject vehicle, a state of a road on which the subject vehicle travels, and a environment around the subject vehicle (step S107).

Specifically, the control device 190 can determine the default option from among options, such as "decelerate automatically" and "change lanes to the right," on the basis of a driving load of the driver among the driving states of the driver. For example, when the driving load of the driver falls above a predetermined reference range or falls below the predetermined reference range, the control device 190 can determine the option of "change lanes to the right" as the default option.

In addition or alternatively, the control device 190 can determine the default option from among options, such as "decelerate automatically" and "change lanes to the right," on the basis of a travel history of the driver among the travel states of the subject vehicle. For example, the control device 190 specifies a road which the driver uses on the way to work, on the basis of the travel history of the driver. When road repairing continues for a certain period of time on the road which the driver uses on the way to work, the control device 190 can determine the option of "change lanes to the right" to avoid a lane obstructed due to the road repairing, as the default option. Thus, the option for avoiding the obstructed point is set as the default option and the driver can therefore drive while feeling secure.

In addition or alternatively, the control device 190 can determine the default option from among options, such as "decelerate automatically" and "change lanes to the right," on the basis of a route toward a destination among the travel states of the subject vehicle. For example, provided that the subject vehicle has to turn right soon in order to travel on a route toward the destination, when the right lane adjacent to the traveling lane of the subject vehicle is not obstructed, the subject vehicle will change lanes to the right. The control device 190 can therefore determine the option of "change lanes to the right" as the default option.

In addition or alternatively, the control device 190 can determine the default option from among options, such as "decelerate automatically" and "change lanes to the right," on the basis of a vehicle speed of the subject vehicle among the travel states of the subject vehicle. For example, when the vehicle speed of the subject vehicle is a predetermined speed or higher, the subject vehicle will arrive early at the obstructed point. The control device 190 can therefore determine the option of "change lanes to the right" as the default option. This allows the driver to feel more secure.

In addition or alternatively, the control device 190 can determine the default option from among options, such as "decelerate automatically" and "change lanes to the right," on the basis of a congestion degree of a road on which the subject vehicle travels, among the states of the road. For example, when the congestion degree of the road on which the subject vehicle travels is a predetermined value or lower, the control device 190 can determine the option of "change lanes to the right" as the default option. Lane change is relatively easy on a road of which the congestion degree is low, and the lane change can be performed in advance thereby to allow the driver to drive while feeling secure.

In addition or alternatively, the control device 190 can determine the default option from among options, such as "decelerate automatically" and "change lanes to the right," on the basis of the number of lanes of a road on which the subject vehicle travels, among the states of the road. For example, when the number of lanes of the road on which the subject vehicle travels is a predetermined number or larger, lane change is relatively easy. The control device 190 can therefore determine the option of "change lanes to the right" as the default option.

In addition or alternatively, the control device 190 can determine the default option from among options, such as "decelerate automatically" and "change lanes to the right," on the basis of the weather and/or time among the environments around the subject vehicle. For example, since rain causes poorer visibility than that in fine weather, the driver is liable to desire early completion of lane change. When it rains, therefore, the control device 190 can determine the option of "change lanes to the right" as the default option. Similarly, also in the nighttime, the control device 190 can determine the option of "change lanes to the right" as the default option.

Thus, in the "obstruction scene of the subject vehicle's lane," the control device 190 can determine the default option to be initially selected from among a plurality of options, such as "decelerate automatically" and "change lanes to the right," which the subject vehicle can executes, on the basis of the travel state, such as a driving state of the driver, a travel state of the subject vehicle, a state of a road on which the subject vehicle travels, and an environment around the subject vehicle.

Description will then be explained to a method of determining the presentation condition in the "obstruction scene of the subject vehicle's lane." The control device 190 refers to the table illustrated in FIG. 2 to acquire the presentation condition of the presentation information in the "obstruction scene of the subject vehicle's lane." For example, in the example illustrated in FIG. 2, the control device 190 acquires a condition that "the time for arriving at an obstructed point is S7 or less" as the presentation condition of the presentation information in the "obstruction scene of the subject vehicle's lane." Further, the control device 190 changes the acquired presentation condition on the basis of the travel state, such as a driving state of the driver, a travel state of the subject vehicle, a state of a road on which the subject vehicle travels, and an environment around the subject vehicle (step S108).

For example, in the "obstruction scene of the subject vehicle's lane," the control device 190 can determine the presentation condition on the basis of the driving load of the driver, the congestion degree of a road on which the subject vehicle is traveling, the shape of a road on which the subject vehicle is traveling, the weather, and the time, as in the "scene of catching up with a preceding vehicle." In addition or alternatively, in the "obstruction scene of the subject vehicle's lane," the control device 190 can determine the presentation condition in the following manner.

That is, the control device 190 can determine the presentation condition on the basis of a direction toward a destination among the travel states of the subject vehicle. For example, when the traveling lane of the subject vehicle is obstructed ahead and the subject vehicle can head to the destination by traveling on the adjacent lane, early lane change enables easy prospects for the oncoming situation and the user can feel more secure. In such a case, therefore, the control device 190 can change the presentation condition so that the presentation information is presented at earlier timing.

In addition or alternatively, the control device 190 can determine the presentation condition on the basis of a vehicle speed of the subject vehicle among the travel states of the subject vehicle. For example, when the vehicle speed of the subject vehicle is lower than the vehicle speed of peripheral vehicles, it will be difficult to find a space for lane change. The control device 190 therefore changes the presentation condition so that the presentation information is presented at earlier timing. This allows the driver to feel more secure.

In addition or alternatively, the control device 190 can change the presentation condition on the basis of a traveling lane in which the subject vehicle travels, among the states of a road on which the subject vehicle travels. For example, when there is the road including a regular lane and an overtaking lane and the subject vehicle is traveling in the regular lane, the control device 190 can change the presentation condition so that the presentation information is presented at earlier timing as compared with when the subject vehicle is traveling in the overtaking lane. This is because, when the regular lane is obstructed, the subject vehicle has to change lanes to the overtaking lane, but when another vehicle travels in the overtaking lane, it may be difficult for the subject vehicle to change lanes soon and early lane change is thus preferred.

In addition or alternatively, the control device 190 can change the presentation condition on the basis of the type of a road on which the subject vehicle travels, among the states of the road. For example, when the subject vehicle is traveling on a relatively small-scale road (such as a minor street and general road), the control device 190 can change the presentation condition so that the presentation information is presented at earlier timing than when the subject vehicle is traveling on a relatively large-scale road (such as an arterial road and highway). This is because a relatively small-scale road has a small number of lanes and, if the traveling lane of the subject vehicle is obstructed, the number of lanes to which the subject vehicle can change lanes will be small. Similarly, the control device 190 can determine the presentation condition on the basis of the number of lanes of a road on which the subject vehicle travels.

Thus, in the "obstruction scene of the subject vehicle's lane," the control device 190 can determine the presentation condition on the basis of the travel state, such as a driving state of the driver, a travel state of the subject vehicle, a state of a road on which the subject vehicle travels, and an environment around the subject vehicle.

At the timing when the subject vehicle satisfies the presentation condition, the control device 190 presents the presentation information to the driver in the above-described presentation mode of an option in a state in which the above-described default option is selected (step S109). Then, when the driver inputs response information in response to the presentation information (step S111=Yes), the control device 190 controls travel of the subject vehicle on the basis of the option which the driver selects (step S113). On the other hand, when the driver does not input response information in the "obstruction scene of the subject vehicle's lane," the control device 190 determines whether or not the subject vehicle satisfies the waiting cancellation condition that "the time for arriving at an obstructed point is S8 (S7>S8) or less," for example, as illustrated in FIG. 2. When the waiting cancellation condition is satisfied, the control device 190 controls travel of the subject vehicle on the basis of the default option (step S113).

The control device 190 operates in this manner in the "obstruction scene of the subject vehicle's lane."

Figure 8:
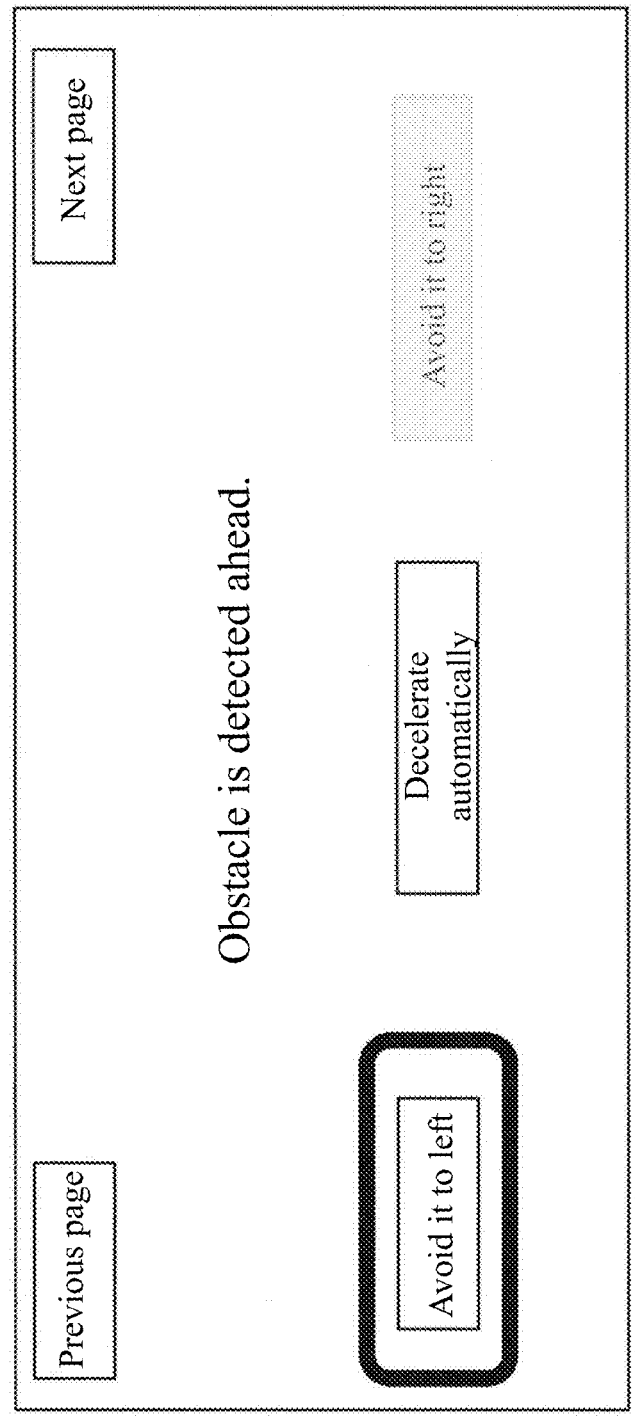
FIG. 8 is a view illustrating an example of presentation information presented by a presentation device in a scene of avoiding an object on a road.

Next, the operation of the control device 190 in a "scene of avoiding an object on a road" will be described. For example, in the example illustrated in FIG. 2, the control device 190 determines whether or not a determination condition that "a pedestrian, bicycle, motorcycle, or a fallen object on a road exists ahead" is satisfied, on the basis of the travel information of the subject vehicle. When the determination condition is satisfied, the control device 190 determines that the travel scene is the "scene of avoiding an object on a road" (step S102) and the control device 190 acquires the presentation information corresponding to the "scene of avoiding an object on a road" (step S103). FIG. 8 is a view illustrating an example of the presentation information which is displayed on the screen of a display as the presentation device 150 in the "scene of avoiding an object on a road."

Then, the control device 190 determines the presentation mode of each option included in the presentation information on the basis of the travel information of the subject vehicle (step S106). For example, in the example illustrated in FIG. 8, the presentation information corresponding to the "scene of avoiding an object on a road" has message information such as "An obstacle is detected ahead." together with options, such as "avoid it to the left," "decelerate automatically," and "avoid it to the right," which the driver can execute in the "scene of avoiding an object on a road." In this case, the control device 190 can determine the presentation mode of each option on the basis of the travel information, such as a driving state of the driver, a travel state of the subject vehicle, a state of a road on which the subject vehicle travels, and an environment around the subject vehicle.

For example, the control device 190 can determine the presentation mode of an option, such as "avoid it to the left," "decelerate automatically," and "avoid it to the right," on the basis of another vehicle and/or an obstacle existing around the subject vehicle, among the travel states of the subject vehicle. When another vehicle exists at the side of the subject vehicle and/or when an obstacle such as a wall and curbstone exists at the side of the subject vehicle, the control device 190 can determine the presentation mode of each option so that the driver cannot easily select an option corresponding to the lane change in the direction in which another vehicle and/or an obstacle exist.

Further, the control device 190 determines the default option from among options, such as "avoid it to the left," "decelerate automatically," and "avoid it to the right," which the driver can execute in the "scene of avoiding an object on a road," on the basis of the travel information, such as a driving state of the driver, a travel state of the subject vehicle, a state of a road on which the subject vehicle travels, and an environment around the subject vehicle (step S107).

Specifically, the control device 190 can determine the default option on the basis of a congestion degree of an adjacent lane to the traveling lane of the subject vehicle among the states of a road on which the subject vehicle travels. More specifically, when the left-side adjacent lane is not so crowded, for example, the control device 190 can determine the option of "avoid it to the left" as the default option. When other vehicles and/or obstacles exist at the right side and left side of the subject vehicle, for example, the control device 190 can determine the option of "decelerate automatically" as the default option.

Then, the control device 190 determines the presentation condition of the presentation information in the "scene of avoiding an object on a road" (step S109). For example, in the example illustrated in FIG. 2, the control device 190 acquires a condition that "an object on the road is detected" as the presentation condition of the presentation information in the "scene of avoiding an object on a road."

At the timing when the subject vehicle satisfies the presentation condition, that is, at the timing when the subject vehicle detects a pedestrian, bicycle, motorcycle, or a fallen object on the road, the control device 190 presents the presentation information to the driver in the above-described presentation mode of an option in a state in which the above-described default option is selected (step S109). Then, when the driver inputs response information or when the waiting cancellation condition that "the TTC with the object on the road is S9 or less" is satisfied, the control device 190 controls travel of the subject vehicle on the basis of the selected option (step S113).

The control device 190 operates in this manner in the "scene of avoiding an object on a road."

Figure 9:
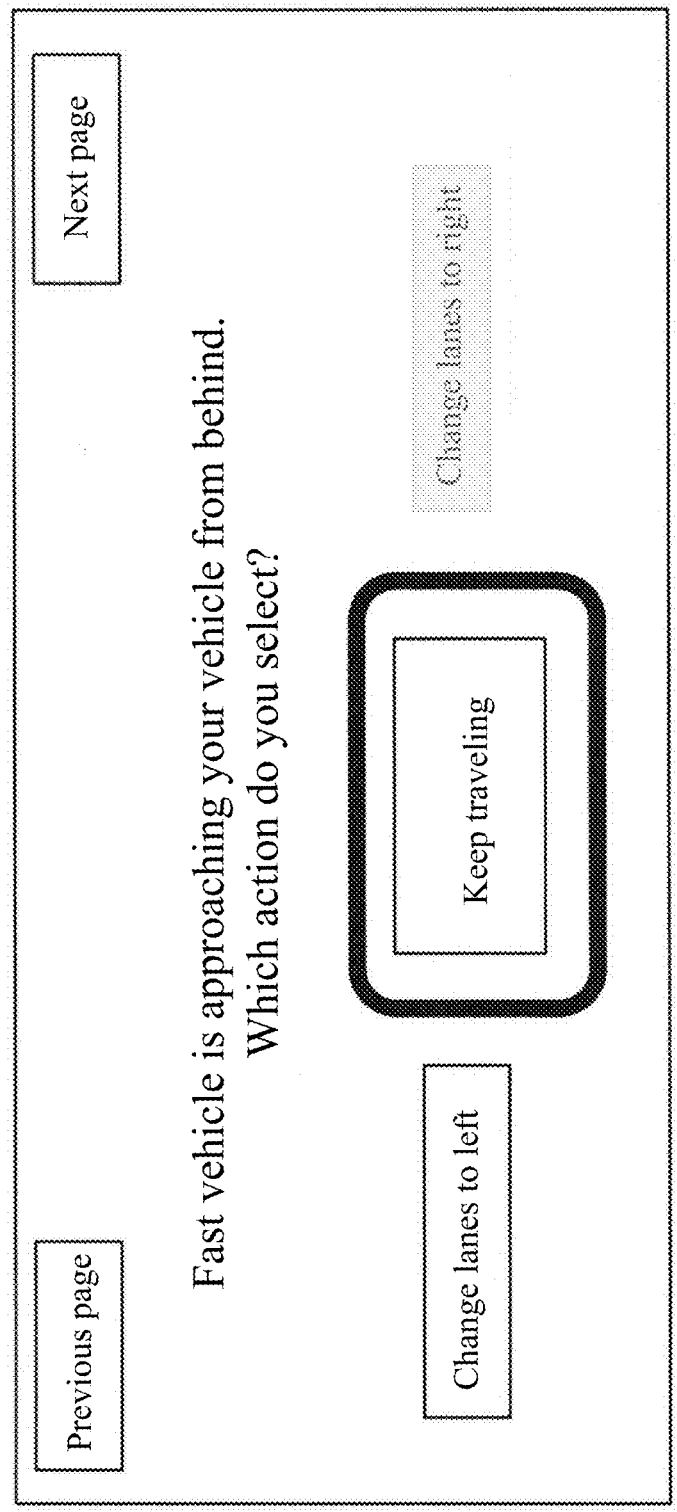
FIG. 9 is a view illustrating an example of presentation information presented by a presentation device in a scene of being caught up by a vehicle from behind.

Next, the operation of the control device 190 in a "scene of being caught up by a vehicle from behind" will be described. For example, as illustrated in FIG. 2, the control device 190 determines whether or not a determination condition that "a following vehicle exists in the traveling lane of the subject vehicle" and "the vehicle speed of the following vehicle>the vehicle speed of the subject vehicle" is satisfied, on the basis of the travel information of the subject vehicle. When the determination condition is satisfied, the control device 190 determines that the travel scene is the "scene of being caught up by a vehicle from behind" (step S102) and the control device 190 acquires the presentation information corresponding to the "scene of being caught up by a vehicle from behind" (step S103). FIG. 9 is a view illustrating an example of the presentation information which is displayed on the screen of a display as the presentation device 150 in the "scene of being caught up by a vehicle from behind."

Then, the control device 190 determines the presentation mode of each option included in the presentation information on the basis of the travel information of the subject vehicle (step S106). For example, in the example illustrated in FIG. 9, the presentation information corresponding to the "scene of being caught up by a vehicle from behind" has message information such as "A fast vehicle is approaching your vehicle from behind. Which action do you select?" together with options, such as "change lanes to the left," "keep traveling," and "change lanes to the right," which the driver can execute in the "scene of being caught up by a vehicle from behind." In this case, the control device 190 determines the presentation mode of each option on the basis of the travel information, such as a driving state of the driver, a travel state of the subject vehicle, a state of a road on which the subject vehicle travels, and an environment around the subject vehicle.

For example, the control device 190 can determine the presentation mode of an option, such as "change lanes to the left," "keep traveling," and "change lanes to the right," on the basis of another vehicle and/or an obstacle existing around the subject vehicle, among the travel states of the subject vehicle. When another vehicle exists at the side of the subject vehicle and/or when an obstacle such as a wall and curbstone exists at the side of the subject vehicle, the control device 190 can determine the presentation mode of each option so that the driver cannot easily select an option corresponding to the lane change in the direction in which another vehicle and/or an obstacle exist.

Further, the control device 190 determines the default option from among options, such as "change lanes to the left," "keep traveling," and "change lanes to the right," which the driver can execute in the "scene of being caught up by a vehicle from behind," on the basis of the travel state, such as a driving state of the driver, a travel state of the subject vehicle, a state of a road on which the subject vehicle travels, and an environment around the subject vehicle (step S107).

Specifically, when a determination is made that the following vehicle approaching the subject vehicle from behind is an emergency vehicle such as an ambulance car and the adjacent lane at the left or right side is not so crowded, the control device 190 can determine the option of "change lanes to the left" or "change lanes to the right" as the default option. The control device 190 can otherwise determine the option of "keep traveling" as the default option.

Then, the control device 190 determines the presentation condition of the presentation information in the "scene of being caught up by a vehicle from behind" (step S109). For example, in the example illustrated in FIG. 2, the control device 190 acquires a condition that "the TTC with the following vehicle is S10 or less" as the presentation condition of the presentation information in the "scene of being caught up by a vehicle from behind."

When the subject vehicle satisfies the presentation condition, the control device 190 presents the presentation information to the driver in the above-described presentation mode of an option in a state in which the above-described default option is selected (step S109). Then, when the driver inputs response information or when the waiting cancellation condition that "the TTC with the following vehicle is S11 (S10>S11) or less" is satisfied, the control device 190 controls travel of the subject vehicle on the basis of the selected option (step S113).

The control device 190 operates in this manner in the "scene of being caught up by a vehicle from behind."

Figure 10:
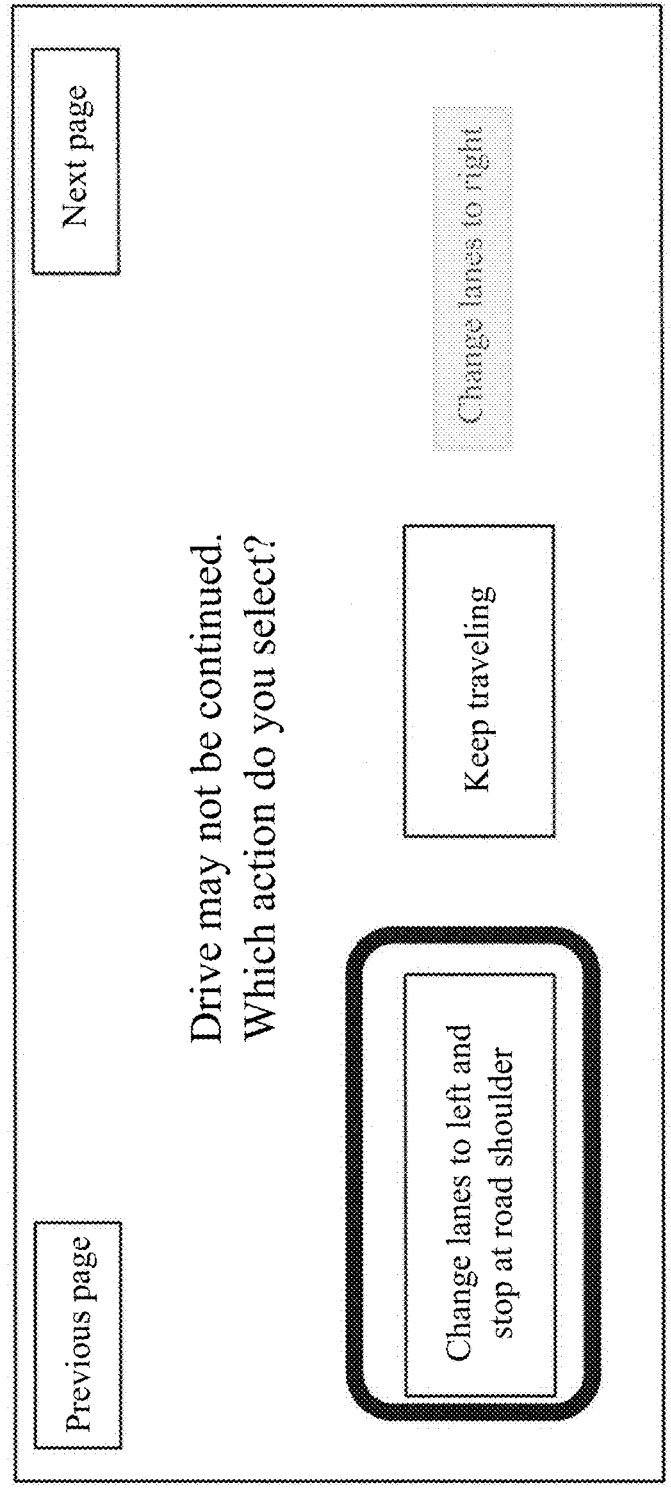
FIG. 10 is a view illustrating an example of presentation information presented by a presentation device in an emergency evacuation scene.

Next, the operation of the control device 190 in an "emergency evacuation scene" will be described. For example, in the example illustrated in FIG. 2, the control device 190 determines, on the basis of the travel information of the subject vehicle, whether or not a determination condition that "the onboard equipment 140 is not operated within a predetermined period of time" and "the driver is determined to be incapable of driving, on the basis of images captured by the in-vehicle camera" is satisfied. When the determination condition is satisfied, the control device 190 determines that the travel scene is the "emergency evacuation scene" (step S102) and the control device 190 acquires the presentation information corresponding to the "emergency evacuation scene" (step S103). FIG. 10 is a view illustrating an example of the presentation information which is displayed on the screen of a display as the presentation device 150 in the "emergency evacuation scene."

Then, the control device 190 determines the presentation mode of each option included in the presentation information on the basis of the travel information of the subject vehicle (step S106). For example, in the example illustrated in FIG. 10, the presentation information corresponding to the "emergency evacuation scene" includes message information such as "The drive may not be continued. Which action do you select?" together with options, such as "change lanes to the left and stop at the road shoulder," "keep traveling," and "change lanes to the right," which the driver can execute in the "emergency evacuation scene." In this case, the control device 190 can determine the presentation mode of each option on the basis of the travel information, such as a driving state of the driver, a travel state of the subject vehicle, a state of a road on which the subject vehicle travels, and an environment around the subject vehicle.

Specifically, the control device 190 can change the presentation mode of an option, such as "change lanes to the left and stop at the road shoulder," "keep traveling," and "change lanes to the right," on the basis of another vehicle and/or an obstacle existing around the subject vehicle, among the travel states of the subject vehicle. When another vehicle exists at the side of the subject vehicle and/or when an obstacle such as a wall and curbstone exists at the side of the subject vehicle, the control device 190 can change the presentation mode of each option so that the driver cannot easily select an option corresponding to the lane change in the direction in which another vehicle and/or an obstacle exist.

In addition or alternatively, the control device 190 can change the presentation mode of an option, such as "change lanes to the left and stop at the road shoulder," "keep traveling," and "change lanes to the right," on the basis of a width of the road shoulder of a road on which the subject vehicle travels, among the states of the road. For example, when the width of the road shoulder of the road on which the subject vehicle travels is a sufficient width, the control device 190 can change the presentation mode of each option so that the driver can easily select the option of "change lanes to the left and stop at the road shoulder."

Further, the control device 190 determines the default option from among options, such as "change lanes to the left and stop at the road shoulder," "keep traveling," and "change lanes to the right," which the driver can execute in the "emergency evacuation scene," on the basis of the travel state, such as a driving state of the driver, a travel state of the subject vehicle, a state of a road on which the subject vehicle travels, and an environment around the subject vehicle (step S107).

For example, the control device 190 can determine the default option on the basis of a congestion degree of the lane in contact with the road shoulder among the states of a road on which the subject vehicle travels. Specifically, when the left-side lane in contact with the road shoulder is not so crowded, the control device 190 can determine the option of "change lanes to the left and stop at the road shoulder" as the default option. The control device 190 can otherwise determine the option of "keep traveling" as the default option.

Then, the control device 190 determines the presentation condition of the presentation information in the "emergency evacuation scene" (step S109). For example, in the example illustrated in FIG. 2, the control device 190 acquires the determination condition of the "emergency evacuation scene" as the presentation condition of the presentation information in the "emergency evacuation scene."

When the subject vehicle satisfies the presentation condition, that is, at the timing when the "emergency evacuation scene" is determined, the control device 190 presents the presentation information to the driver in the above-described presentation mode of an option in a state in which the above-described default option is selected (step S109). Then, when the driver inputs response information or when the waiting cancellation condition that "a predetermined time has passed after the presentation of the message" is satisfied, the control device 190 controls travel of the subject vehicle on the basis of the selected option (step S113).

The control device 190 operates in this manner in the "emergency evacuation scene."

Figure 11:
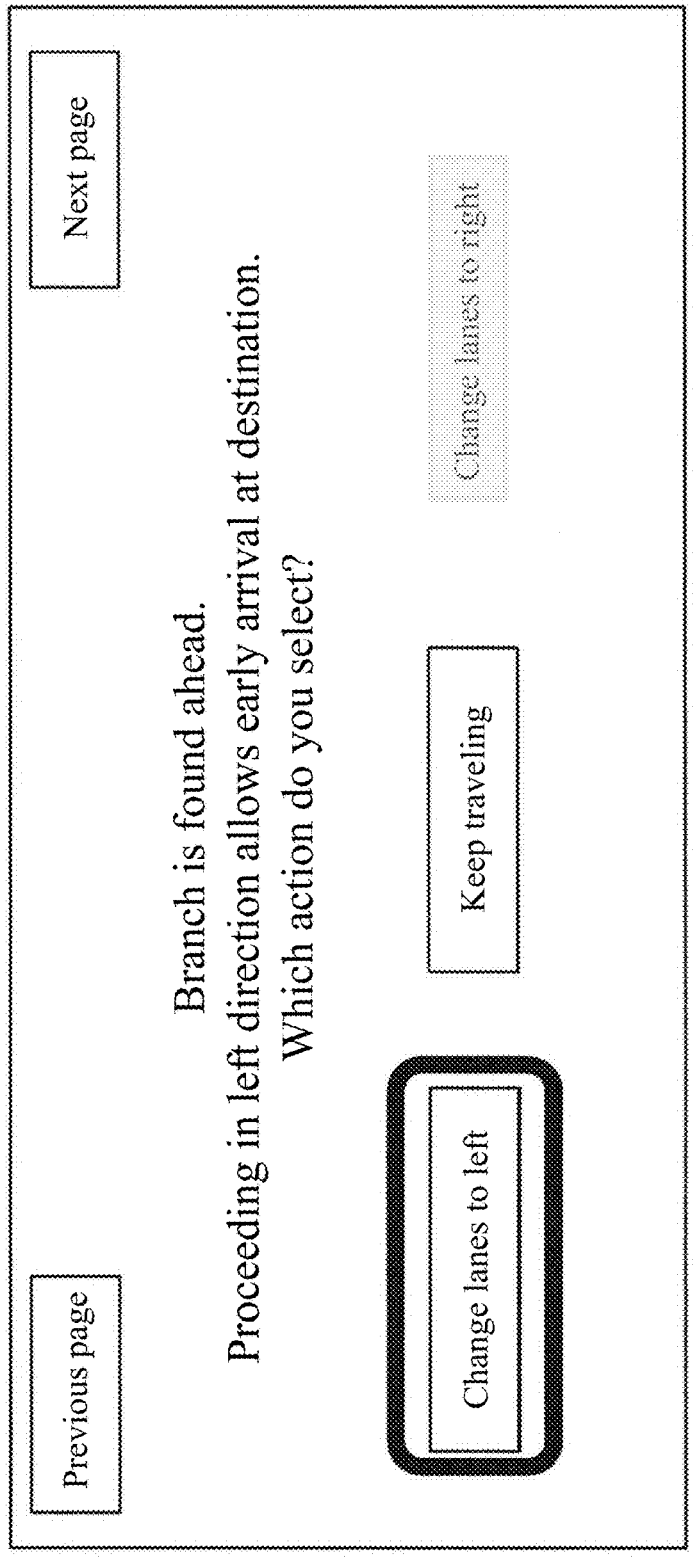
FIG. 11 is a view illustrating an example of presentation information presented by a presentation device in a scene of lane transfer toward a destination.

Next, the operation of the control device 190 in a "scene of lane transfer toward a destination" will be described. For example, as illustrated in FIG. 2, the control device 190 determines, on the basis of the travel information of the subject vehicle, whether or not a determination condition that "a destination is set" and "the time for arriving at a lane change point necessary for arriving at the destination is within 60 seconds" is satisfied. When the determination condition is satisfied, the control device 190 determines that the travel scene is the "scene of lane transfer toward a destination" (step S102) and the control device 190 acquires the presentation information corresponding to the "scene of lane transfer toward a destination" (step S103). FIG. 11 is a view illustrating an example of the presentation information which is displayed on the screen of a display as the presentation device 150 in the "scene of lane transfer toward a destination."

Then, the control device 190 determines the presentation mode of each option included in the presentation information on the basis of the travel information of the subject vehicle (step S106). For example, in the example illustrated in FIG. 11, the presentation information corresponding to the "scene of lane transfer toward a destination" includes message information such as "A branch is found ahead. Proceeding in the left direction allows early arrival at the destination. Which action do you select?" together with options, such as "change lanes to the left," "keep traveling," and "change lanes to the right," which the driver can execute in the "scene of lane transfer toward a destination." In this case, the control device 190 can determine the presentation mode of each option on the basis of the travel information, such as a driving state of the driver, a travel state of the subject vehicle, a state of a road on which the subject vehicle travels, and an environment around the subject vehicle.

For example, the control device 190 can change the presentation mode of an option, such as "change lanes to the left," "keep traveling," and "change lanes to the right," on the basis of another vehicle and/or an obstacle existing around the subject vehicle, among the travel states of the subject vehicle. When another vehicle exists at the side of the subject vehicle and/or when an obstacle such as a wall and curbstone exists at the side of the subject vehicle, the control device 190 can change the presentation mode of each option so that the driver cannot easily select an option corresponding to the lane change in the direction in which another vehicle and/or an obstacle exist.

In addition or alternatively, the control device 190 can change the presentation mode of an option, such as "change lanes to the left," "keep traveling," and "change lanes to the right," on the basis of a road regulation and/or traffic sign among the states of a road on which the subject vehicle travels. For example, the control device 190 can change the presentation mode of each option so that, in a lane change prohibition zone, the driver cannot easily select the option of "change lanes to the left" and the option of "change lanes to the right."

In addition or alternatively, in a case in which, if the option of "change lanes to the left" or "change lane to the right" is performed to proceed in the left or right direction at the branch, the time for arriving at the destination will delay by a predetermined time or longer, the control device 190 can determine the presentation mode of each option so that the driver cannot easily select an option corresponding to the lane change toward such a direction. For example, in a case in which, if lane change to the right is performed to keep traveling on the right-side lane, the time for arriving at the destination will delay by a predetermined time or longer, the control device 190 can determine the presentation mode of each option so that the driver cannot easily select the option of "change lane to the right."

Further, the control device 190 determines the default option from among options, such as "change lanes to the left," "keep traveling," and "change lanes to the right," which the driver can execute in the "scene of lane transfer toward a destination," on the basis of the travel state, such as a driving state of the driver, a travel state of the subject vehicle, a state of a road on which the subject vehicle travels, and an environment around the subject vehicle (step S107).

For example, the control device 190 can determine an option with which the subject vehicle is to proceed in the direction toward the destination as the default option, from among options, such as "change lanes to the left," "keep traveling," and "change lanes to the right." If, for example, the subject vehicle can head to the destination when changing lanes to the right to keep traveling on the right-side lane, the control device 190 can determine the option of "change lane to the right" as the default option.

Then, the control device 190 determines the presentation condition of the presentation information in the "scene of lane transfer toward a destination" (step S109). For example, in the example illustrated in FIG. 2, the control device 190 acquires a condition that "the time for arriving at a lane change point is S12 or less" as the presentation condition of the presentation information in the "scene of lane transfer toward a destination."

When the subject vehicle satisfies the presentation condition, the control device 190 presents the presentation information to the driver in the above-described presentation mode of an option in a state in which the above-described default option is selected (step S109). Then, when the driver inputs response information or when the waiting cancellation condition that "the time for arriving at a lane change point is S13 (S12>S13) or less" is satisfied, the control device 190 controls travel of the subject vehicle on the basis of the selected option (step S113).

The control device 190 operates in this manner in the "scene of lane transfer toward a destination."

Figure 12:
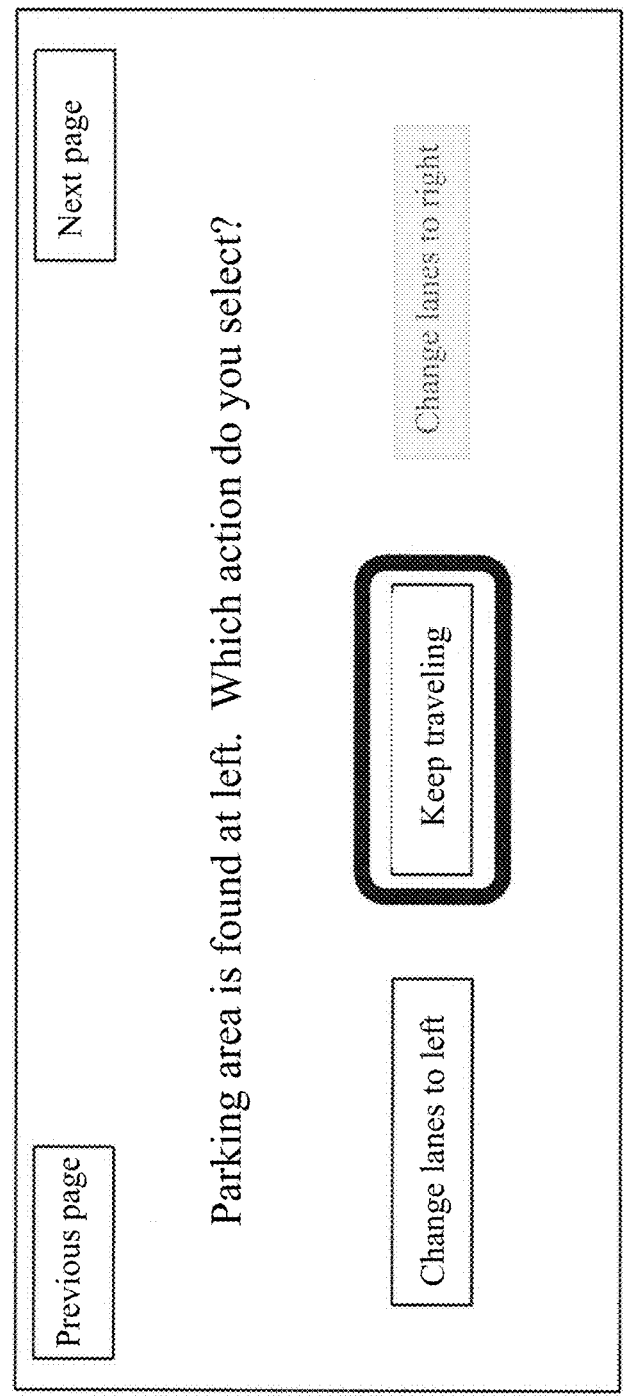
FIG. 12 is a view illustrating an example of presentation information presented by a presentation device in a scene of heading to an SA/PA.

Next, the operation of the control device 190 in a "scene of heading to a service area (SA)/parking area (PA)" will be described. For example, in the example illustrated in FIG. 2, the control device 190 determines whether or not a determination condition that "the time for arriving at an SA/PA is within 60 seconds" is satisfied, on the basis of the travel information of the subject vehicle. When the determination condition is satisfied, the control device 190 determines that the travel scene is the "scene of heading to an SA/PA" (step S102) and the control device 190 acquires the presentation information corresponding to the "scene of heading to an SA/PA" (step S103). FIG. 12 is a view illustrating an example of the presentation information which is displayed on the screen of a display as the presentation device 150 in the "scene of heading to an SA/PA."

Then, the control device 190 determines the presentation mode of each option included in the presentation information on the basis of the travel information of the subject vehicle (step S106). For example, in the example illustrated in FIG. 12, the presentation information corresponding to the "scene of heading to an SA/PA" includes message information such as "A parking area is found at the left. Which action do you select?" together with options, such as "change lanes to the left," "keep traveling," and "change lanes to the right," which the driver can execute in the "scene of heading to an SA/PA." In this case, the control device 190 determines the presentation mode of each option on the basis of the travel information, such as a driving state of the driver, a travel state of the subject vehicle, a state of a road on which the subject vehicle travels, and an environment around the subject vehicle.

For example, the control device 190 can change the presentation mode of an option, such as "change lanes to the left," "keep traveling," and "change lanes to the right," on the basis of another vehicle and/or an obstacle existing around the subject vehicle, among the travel states of the subject vehicle. When another vehicle exists at the side of the subject vehicle and/or when an obstacle such as a wall and curbstone exists at the side of the subject vehicle, the control device 190 can determine the presentation mode of each option so that the driver cannot easily select an option corresponding to the lane change in the direction in which another vehicle and/or an obstacle exist.

In addition or alternatively, the control device 190 can determine the presentation mode of an option, such as "change lanes to the left," "keep traveling," and "change lanes to the right," on the basis of a road regulation and/or traffic sign among the states of a road on which the subject vehicle travels. For example, the control device 190 can change the presentation mode of each option so that, in a lane change prohibition zone, the driver cannot easily select the option of "change lanes to the left" and the option of "change lanes to the right."

In addition or alternatively, the control device 190 may determine whether or not the service area or parking area is crowded. When the service area or parking area is crowded, the control device 190 can change the presentation mode of each option so that the driver can easily select the option of "keep traveling." The control device 190 can acquire information as to whether the service area or parking area is crowded using road-to-vehicle communication via the communication device 170 thereby to determine whether or not the service area or parking area is crowded.

Further, the control device 190 determines the default option from among options, such as "change lanes to the left," "keep traveling," and "change lanes to the right," which the driver can execute in the "scene of heading to an SA/PA," on the basis of the travel state, such as a driving state of the driver, a travel state of the subject vehicle, a state of a road on which the subject vehicle travels, and an environment around the subject vehicle (step S107).

For example, when the driver continues to drive for two hours or more without taking a break and a service area or parking area exists ahead, the control device 190 may determine an option for changing lanes to the lane at the side of entering the service area or parking area as the default option. The control device 190 can otherwise determine the option of "keep traveling" as the default option.

Then, the control device 190 determines the presentation condition of the presentation information in the "scene of heading to an SA/PA" (step S109). For example, in the example illustrated in FIG. 2, the control device 190 acquires a condition that "the time for arriving at an SA/PA is S14 or less" as the presentation condition of the presentation information in the "scene of heading to an SA/PA."

At the timing when the subject vehicle satisfies the presentation condition, the control device 190 presents the presentation information to the driver in the above-described presentation mode of an option in a state in which the above-described default option is selected (step S109). Then, when the driver inputs response information or when the waiting cancellation condition that "the time for arriving at an SA/PA is S15 (S14>S15) or less" is satisfied, the control device 190 controls travel of the subject vehicle on the basis of the selected option (step S113).

The control device 190 operates in this manner in the "scene of heading to an SA/PA."

Figure 13:
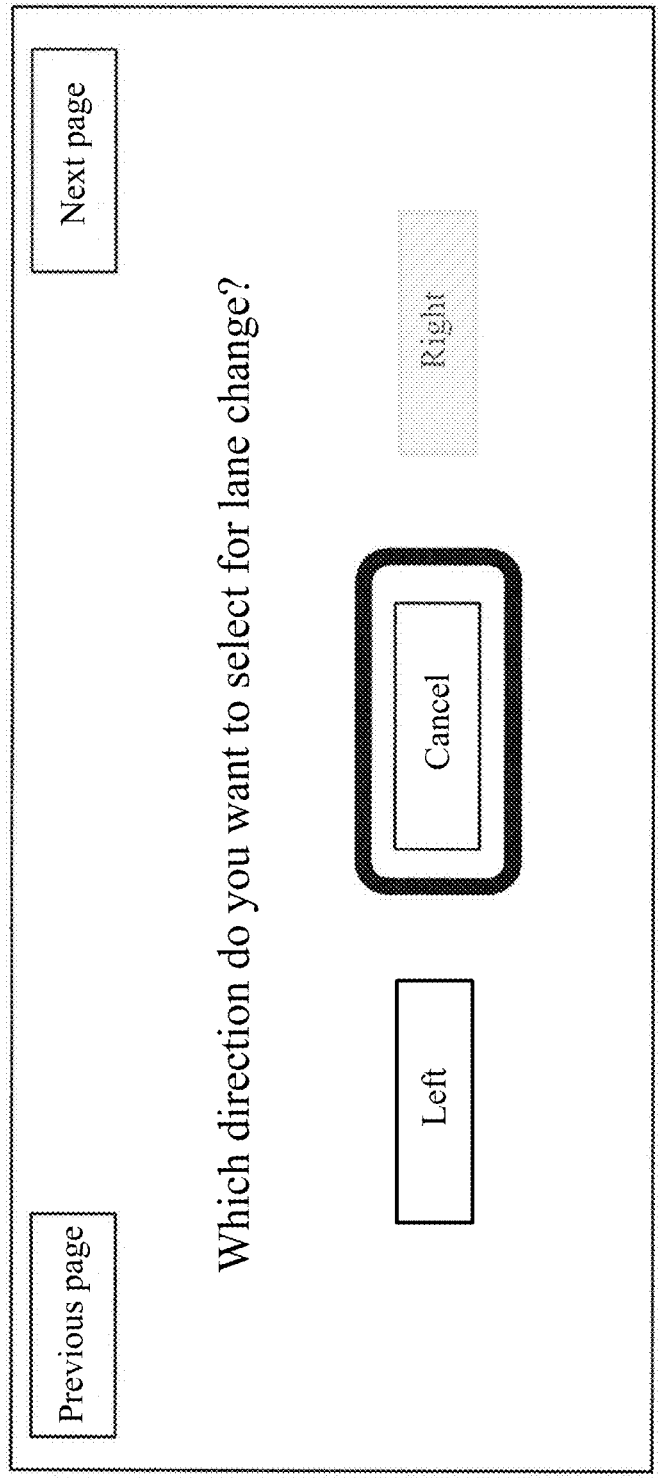
FIG. 13 is a view illustrating an example of presentation information presented by a presentation device in a scene of performing lane change.

In the present embodiment, the driver can operate the input device 160 to allow the control device 190 to present the presentation information for inquiring lane change of the driver, as illustrated in FIG. 13. For example, the presentation information illustrated in FIG. 13 includes message information such as "Which direction do you want to select for lane change?" together with options, such as "change lanes to the left," "cancel," and "change lanes to the right." In this case, the control device 190 can change the presentation mode of each option on the basis of the travel information, such as a driving state of the driver, a travel state of the subject vehicle, a state of a road on which the subject vehicle travels, and an environment around the subject vehicle.

For example, when another vehicle exists at the side of the subject vehicle and/or when an obstacle such as a wall and curbstone exists at the side of the subject vehicle, the control device 190 can change the presentation mode of each option so that the driver can easily select the option of "cancel." When the subject vehicle travels in a lane change prohibition zone, the control device 190 can change the presentation mode of each option so that the driver can easily select the option of "cancel." When the difference between the vehicle speed set for the subject vehicle and the vehicle speed of a preceding vehicle is less than 10 km/h, the control device 190 can change the presentation mode of each option so that the driver can easily select the option of "cancel." This is because the time required for overtaking the preceding vehicle is long.

When the presentation information for inquiring lane change of driver is presented in the above manner, the control device 190 can determine the option of "cancel" as the default option to be initially selected.

The control device 190 can set a condition that N seconds have passed after presenting the presentation information for making an inquiry about lane change to the driver, for example, as the waiting cancellation condition. When the driver does not input response information, the control device 190 can control travel of the subject vehicle on the basis of the default option after N seconds have passed from the presentation of the presentation information. When the driver operates the onboard equipment 140, the control device 190 can extend N seconds of the waiting cancellation condition by about five seconds.

As the above, in the present embodiment, the travel scene is determined on the basis of the travel state of the subject vehicle and the presentation information corresponding to the travel scene is presented to the driver. When the driver inputs response information in response to the presentation information, travel of the subject vehicle is controlled on the basis of the response information input by the driver. Through this operation, travel control can be performed based on the determination by the driver and the uncomfortable feeling given to the driver can be mitigated when the travel control is performed.

In the present embodiment, the presentation information is associated with its priority level. When the actual travel scene of the subject vehicle falls under travel scenes corresponding to two or more items of the presentation information, the driver is presented with the presentation information of which the priority level is highest. The driver can thereby be appropriately presented with the presentation information which the driver needs.

In the present embodiment, an option that is suitable for the travel state of the subject vehicle is determined as the default option in each travel scene and the presentation information is presented to the driver in a state in which the default option is preliminarily selected. This operation can mitigate the burden of the driver when selecting an option and allow the driver to feel more secure. When the driver does not input response information and the waiting cancellation condition is satisfied after the presentation information is presented to the driver in a state in which the default option is preliminarily selected, the subject vehicle can be controlled on the basis of the default option. Through this operation, travel of the subject vehicle can be appropriately controlled even in a situation in which the driver cannot select an option.

In the above-described embodiment, the presentation mode of each option can be changed on the basis of the travel state of the subject vehicle so that the driver can (or cannot) easily select a part of a plurality of options included in the presentation information. This operation can make it easy for the driver to select an option that is preferred to be selected by the driver (or make it difficult for the driver to select an option that is not preferred to be selected by the driver) in each travel scene. The burden of the driver when selecting an option can thus be mitigated.

In the present embodiment, the presentation information is presented to the user at the timing when the presentation condition associated with the presentation information is satisfied. This operation can mitigate the user's stress due to the presentation information being presented for a long time. In the present embodiment, the presentation information can be changed on the basis of the travel state of the subject vehicle thereby to allow the presentation information to be presented at timing suitable for the travel state of the subject vehicle.

Second Embodiment

Next, the travel control device according to a second embodiment will be described. The travel control device 100 according to the second embodiment has the same configuration as that of the travel control device 100 according to the first embodiment and operates in the same manner as in the first embodiment except that the travel control device 100 operates as described below.

The control device 190 according to the second embodiment further has a history information storage function, driver state estimation function, and specific travel control function in addition to the functions of the control device 190 according to the first embodiment. Each function will be described below.

The control device 190 uses the history information storage function to store history information in a memory of the control device 190. The history information includes the number of times of presenting the presentation information by the presentation device 150. The control device 190 stores history information, which includes the number of times of inputting the response information by the input device 160, in a memory of the control device 190. The control device 190 acquires operational information of the onboard equipment 140 from the onboard equipment 140 and stores operational history information in a memory of the control device 190. The operational history information includes the number of times of operating the onboard equipment 140 by the driver.

The control device 190 uses the driver state estimation function to estimate a state of the driver on the basis of the history information of the presentation information, the history information of the response information, and the operational history information of the onboard equipment 140. For example, the control device 190 acquires the number of times D of presenting the presentation information and the number of times I of inputting the response information during a predetermined period of time (e.g. ten minutes) until now from the memory of the control device 190. Then, the control device 190 determines whether the value (I/D) obtained by dividing the number of times I of inputting the response information during the predetermined period of time by the number of times D of presenting the presentation information is not larger than a predetermined value T1, as represented by Expression (1) below.

$$(\text{The number of times } I \text{ of inputting response information/The number of times } D \text{ of presenting presentation information}) \leq \text{Predetermined value } T1 \qquad (1)$$

When the number of times D of presentation of the presentation information is zero, the above Equation (1) is applied on the assumption that the number of times D of presentation is one.

The control device 190 further acquires the number of times H of operating the onboard equipment 140 during a predetermined period of time (e.g. ten minutes) until now on the basis of the operational history information of the onboard equipment 140. Then, the control device 190 determines whether the number of times H of operating the onboard equipment 140 is not more than a predetermined value T2, as represented by Expression (2) below.

$$\text{The number of times } H \text{ of operating onboard equipment } 140 \leq \text{Predetermined value } T2 \qquad (2)$$

When the conditions of the above Expressions (1) and (2) are satisfied, the control device 190 estimates that the driver may be in an emergency state in which the driver cannot respond to the presentation information, such as due to sudden illness.

When the driver state estimation function estimates that the driver may be in an emergency state, the control device 190 uses the specific travel control function to perform control for evacuating the subject vehicle to an evacuation space. For example, the control device 190 searches a space to which the subject vehicle can evacuate, and uses the travel control function to move the subject vehicle to the evacuation space and to park the subject vehicle in the evacuation space. Detailed contents of a specific travel control process executed by the specific travel control function will be described later.

Figure 14:
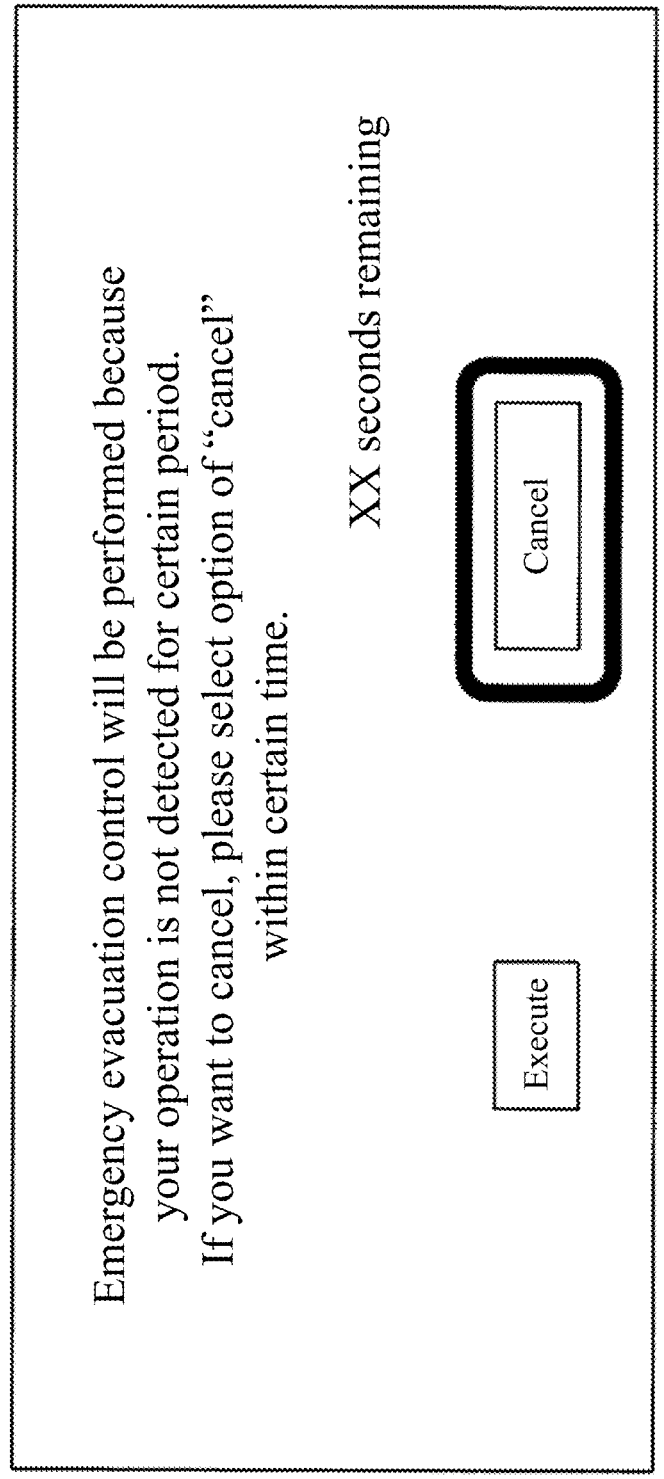
FIG. 14 is a view illustrating an example of presentation information presented by a presentation device in specific travel control according to a second embodiment.

In the second embodiment, when the driver state estimation function estimates that the driver may be in an emergency state, the control device 190 uses the presentation function to present the presentation information for inquiring as to whether or not to evacuate to an evacuation space of the driver. Here, FIG. 14 is a view illustrating an example of the presentation information which is displayed by the presentation device 150 in the specific travel control according to the second embodiment. For example, the control device 190 can present the presentation information, as illustrated in FIG. 14, which includes message information such as "Emergency evacuation control will be performed because your operation is not detected for a certain period. If you want to cancel, please select the option of 'cancel' within a certain time." The presentation information may further include information regarding the remaining time within which the evacuation control can be canceled, such as "XX seconds remaining."

In this case, the control device 190 can present the presentation information which includes two options of "execute" and "cancel" of the evacuation control. The option of "cancel" may be presented as the default option. In the second embodiment, when the driver does not select any option and the time within which the evacuation control can be canceled becomes zero, the control device 190 executes the evacuation control (specific travel control) to evacuate the subject vehicle to the evacuation space. That is, in the second embodiment, the option of "cancel" is set as the default option so that the driver can easily select the option of "cancel" of the evacuation control, but when the driver does not respond for a certain period of time, the default option is not selected and the evacuation control is executed.

Figure 15:
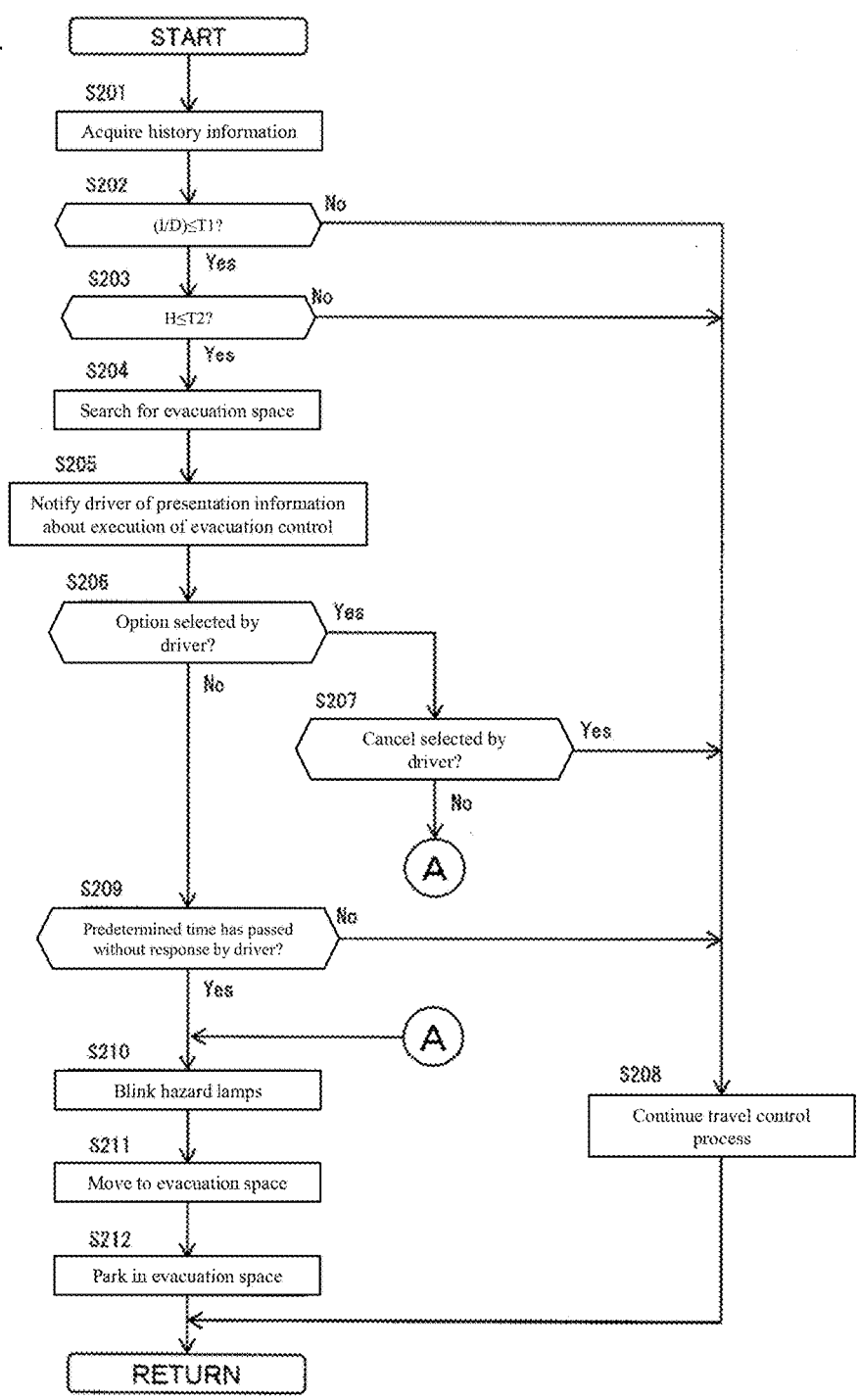
FIG. 15 is a flowchart illustrating a specific travel control process according to the second embodiment.

Next, with reference to FIG. 15, the specific travel control process according to the second embodiment will be described. FIG. 15 is a flowchart illustrating the specific travel control process according to the second embodiment. The specific travel control process described below can be executed, for example, by the control device 190 in parallel with the travel control process according to the first embodiment. The specific travel control process is performed in a repetitive manner at regular intervals.

In step S201, the control device 190 uses the driver state estimation function to acquire the history information. Specifically, the control device 190 uses the driver state estimation function to acquire the history information of the presentation information which is presented by the presentation device 150, the history information of the response information which is input via the input device 160, and the operational history information of the onboard equipment 140, from the memory of the control device 190.

In step S202, the control device 190 uses the driver state estimation function to determine whether the value (I/D) obtained by dividing the number of times I of inputting the response information by the number of times D of presenting the presentation information is not larger than a predetermined value T1, as represented by the above Expression (1). When the value (I/D) is not larger than the predetermined value T1, that is, when the fraction of response to the presentation information by the driver is low, the routine proceeds to step S203. When the value (I/D) is larger than the predetermined value T1, that is, when the fraction of response to the presentation information by the driver is high, the routine proceeds to step S208. In step S208, the control device 190 continues the travel control process illustrated in FIG. 4.

In step S203, the control device 190 determines whether the number of times H of operating the onboard equipment 140 is not more than a predetermined value T2 on the basis of the operational history information of the onboard equipment 140 which is acquired in step S201. When the number of times H of operating the onboard equipment 140 is more than the predetermined value T2, the routine proceeds to step S208 in which the travel control process illustrated in FIG. 4 is continued. When the number of times H of operating the onboard equipment 140 is not more than the predetermined value T2, the routine proceeds to step S204.

In step S204, since the value (I/D) obtained by dividing the number of times I of inputting response information by the number of times D of presenting the presentation information is not larger than the predetermined value T1 and the count H of operation of the onboard equipment 140 is not more than the predetermined value T2, the control device 190 uses the driver state estimation function to estimate that the driver may be in an emergency state in which the driver cannot respond to the presentation information, such as due to sudden illness. To deal with this situation, the specific travel control function is used to search an evacuation space to which the subject vehicle evacuates.

For example, when the subject vehicle is traveling on a highway, the control device 190 can search the nearest parking area or service area as the evacuation space on the basis of the map information of the map database 130. In addition or alternatively, when the subject vehicle is on a road on which parking is permitted at the road shoulder, the control device 190 may use the specific travel control function to search a space at the road shoulder, in which the subject vehicle can be parked, on the basis of the detection results of the front camera, side radars, etc. included in the sensor 110.

In step S205, the control device 190 uses the presentation function to present the presentation information as to whether or not to perform the evacuation control, as illustrated in FIG. 14, to the driver. In addition or alternatively, the presentation function may be used to present the presentation information by voice or the like. When presenting the presentation information, the presentation function may be used to set the option of "cancel" as the default option.

Then, in step S206, the control device 190 uses the specific travel control function to determine whether or not the driver selects any of the options of "execute" and "cancel" of the evacuation control (specific travel control) in response to the presentation information which is presented in step S205. When the driver selects any of the options, the routine proceeds to step S207. When the driver does not select both the options, the routine proceeds to step S209.

In step S207, since it is determined that the driver selects any of the options, the control device 190 uses the specific travel control function to determine whether or not the driver selects the option of "cancel" of the evacuation control (specific travel control) in response to the presentation information which is presented in step S205. When the driver selects the option of "cancel" of the evacuation control, the routine proceeds to step S208 to continue the travel control process as illustrated in FIG. 4. When the driver selects the option of "execute" of the evacuation control, the routine proceeds to step S210 to execute the evacuation control (specific travel control).

When, in step S206, the driver does not select both the options, the routine proceeds to step S209 in which the control device 190 uses the specific travel control function to determine whether or not a predetermined time has passed after presentation in step S205 of the presentation information of performing the evacuation control (specific travel control) in a state in which the driver does not input response information. When the predetermined time has not passed, the routine proceeds to step S208 in which the travel control process illustrated in FIG. 4 is continued. When the predetermined time has passed without a response from the driver, the routine proceeds to step S210 to execute the evacuation control (specific travel control).

In step S206, S207, or S209, even if the driver does not directly select the presentation of "cancel" on the display of the presentation device 150 via the input device 160, when the driver performs some operation, such as an operation of the steering and/or accelerator pedal and operation of the onboard equipment 140, the control device 190 may deem that the option of "cancel" of the evacuation control (specific travel control) is selected, and the routine can proceed to step S208.

In steps S210 to S212, the control device 190 uses the specific travel control function to execute the evacuation control (specific travel control). First, in step S210, the control device 190 uses the specific travel control function to start blinking of hazard lamps. Blinking of hazard lamps can inform other drivers in peripheral vehicles of an emergency state of the driver in the subject vehicle and start of evacuation control. Then, in step S211, the control device 190 uses the specific travel control function to perform evacuation control in which the subject vehicle is automatically moved to the evacuation space searched in step S204. After the subject vehicle is moved to the evacuation space, the routine proceeds to step S212, the control device 190 uses the specific travel control function to park the subject vehicle in the evacuation space. For example, the control device 190 can automatically operate the parking brake to park the subject vehicle in the evacuation space.

As the above, the travel control device 100 according to the second embodiment estimates whether or not the driver may be in an emergency state in which the driver cannot respond to the presentation information, on the basis of the history information of the presentation information and response information and the operational history information of the onboard equipment 140. Then, when it is estimated that the driver may be in an emergency state, the driver is presented with the presentation information as to whether or not to perform the evacuation control (specific travel control) for evacuating the subject vehicle to an evacuation space. Then, when the driver selects execution of the evacuation control or when the driver cannot respond to the presentation information, the evacuation control is performed and subject vehicle is automatically evacuated to the evacuation space. According to the second embodiment, the following effect can be obtained in addition to those of the first embodiment. That is, even when the driver is in an emergency state in which the driver cannot respond to the presentation information, the subject vehicle can be moved to an evacuation space thereby to protect the driver in safety.

In the second embodiment, the option of "cancel" may be set as the default option from among options included in the presentation information. This setting allows the driver to promptly reflect the driver's intention of refusal to transition from the travel control to the evacuation control (specific travel control).

In the second embodiment, a configuration is exemplified in which an evacuation space is searched and the subject vehicle is moved to the evacuation space, but the present invention is not limited to this configuration. Another configuration may be possible in which the subject vehicle is parked at a road shoulder, for example, provided that the subject vehicle can be parked in the vicinity of the current position or at a road shoulder in case of emergency. Also in such cases, the driver can be protected in safety when the driver is in an emergency state in which the driver cannot respond to the presentation information.

Third Embodiment

Next, the travel control device according to a third embodiment will be described. The travel control device 100 according to the third embodiment has the same configuration as that of the travel control device 100 according to the second embodiment and operates in the same manner as in the second embodiment except that the travel control device 100 operates as described below.

In the third embodiment, the control device 190 uses the driver state estimation function to estimate whether or not the driver may be in an asleep state (including a drowsy state), on the basis of the history information of the presentation information presented by the presentation device 150, the history information of the response information input via the input device 160, and the operational history information of the onboard equipment 140. For example, the control device 190 may use the driver state estimation function to determine that the driver may be in an asleep state when the conditions of the above Expressions (1) and (2) are satisfied. Another configuration may also be employed which determines whether or not the driver is in an asleep state using predetermined values T3 and T4 as substitute for the predetermined values T1 and T2 in the above Expressions (1) and (2). The predetermined values T3 and T4 are smaller than the predetermined values T1 and T2, respectively.

In the third embodiment, the control device 190 can use the specific travel control function and the driver state estimation function in the following manner. That is, when it is estimated that the driver may be in an asleep state, the control device 190 can perform control (specific travel control) so as to cancel the automatic travel by the travel control function. The driver can thus be forced to drive and stay awake.

Figure 16:
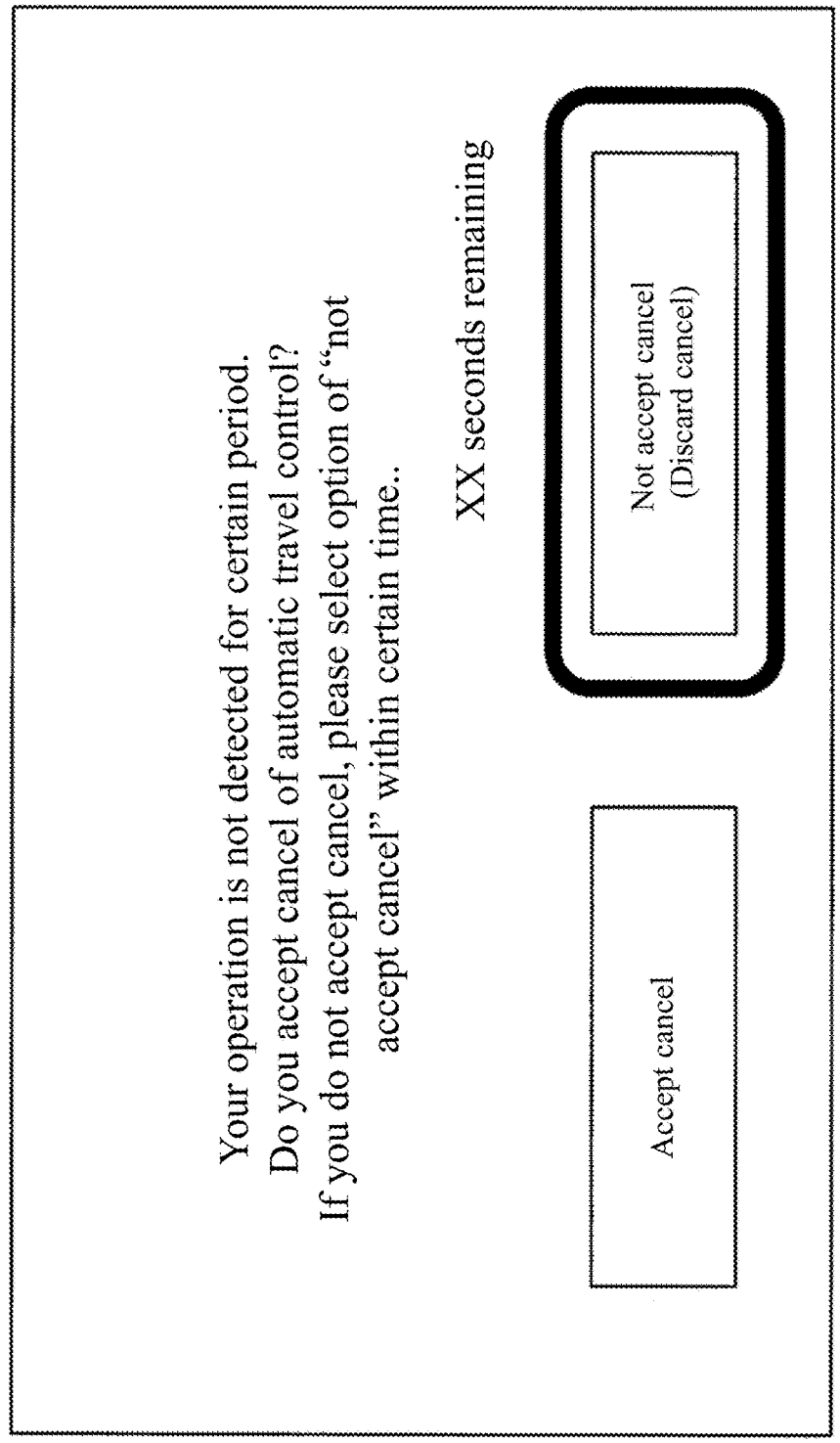
FIG. 16 is a view illustrating an example of presentation information presented by a presentation device in specific travel control according to a third embodiment.

In the third embodiment, when it is estimated that the driver may be in an asleep state, the control device 190 uses the presentation function to present the presentation information for inquiring whether or not to cancel the travel control of the driver by the travel control function. Here, FIG. 16 is a view illustrating an example of the presentation information which is displayed by the presentation device 150 in the evacuation control according to the third embodiment. For example, the control device 190 can use the presentation function to present the presentation information, as illustrated in FIG. 16, which includes message information such as "Your operation is not detected for a certain period. Do you accept cancel of automatic travel control? If you do not accept cancel, please select the option of 'not accept cancel' within a certain time." The presentation information may further include information regarding the remaining time within which cancel of the automatic travel can be discarded, such as "XX seconds remaining."

In this case, the presentation function can be used to present the presentation information which includes two options of "accept cancel" and "not accept cancel (discard cancel)." The option of "not accept cancel (discard cancel)" may be presented as the default option. This allows the driver to promptly select the option of "not accept cancel (discard cancel)."

Figure 17:
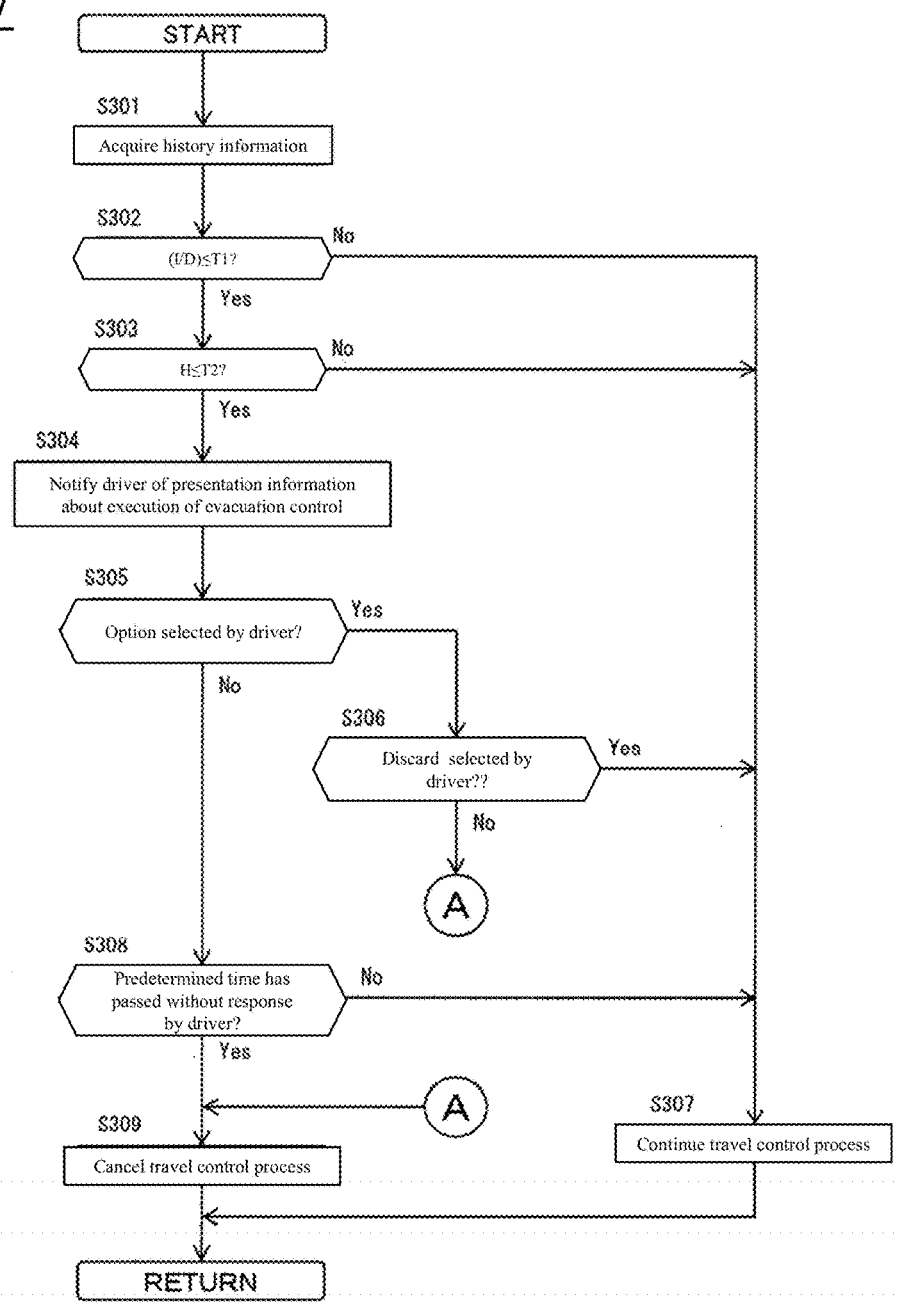
FIG. 17 is a flowchart illustrating a specific travel control process according to the third embodiment.

Next, with reference to FIG. 17, the specific travel control process according to the third embodiment will be described. FIG. 17 is a flowchart illustrating the specific travel control process according to the third embodiment. As in the second embodiment, the specific travel control process described below can be executed, for example, by the control device 190 in parallel with the travel control process according to the first embodiment. The specific travel control process is performed in a repetitive manner at regular intervals.

In steps S301 to S303 which are similar to steps S201 to S203 in the second embodiment, the history information is acquired (step S301), a determination is made as to whether the value obtained by dividing the number of times I of inputting the response information by the number of times D of presenting the presentation information is not larger than a predetermined value T1 (step S302), and a determination is made as to whether the count H of operation of the onboard equipment 140 is not more than a predetermined value T2 (step S303). Then, when the value obtained by dividing the count I of input of the response information by the number of times D of presenting the presentation information is not larger than the predetermined value T1 (step S302=Yes) and the number of times H of operating the onboard equipment 140 is not more than the predetermined value T2 (step S303=Yes), it is estimated that the driver may be in an asleep state, and the routine proceeds to step S304.

In step S304, the control device 190 uses the presentation function to present the presentation information of canceling the automatic travel to the driver. Specifically, the control device 190 presents the presentation information of canceling the travel control by the travel control function, as illustrated in FIG. 16, to the driver.

In step S305, the control device 190 uses the specific travel control function to determine whether or not the driver selects any of the options of "accept cancel" and "not accept cancel (discard cancel)" of the travel control in response to the presentation information which is presented in step S304. When the driver selects any of the options, the routine proceeds to step S306. When the driver does not select both the options, the routine proceeds to step S308.

In step S306, since it is determined that the driver selects any of the options, the control device 190 uses the specific travel control function to determine whether the driver selects the option of "not accept cancel (discard cancel)" of the travel control in response to the presentation information which is presented in step S304. When the driver selects the option of "not accept cancel (discard cancel)" of the travel control, the routine proceeds to step S307 to continue the travel control process illustrated in FIG. 4. When the driver selects the option of "accept cancel" of the travel control, the routine proceeds to step S309 to cancel the travel control.

When, in step S305, the driver does not select both the options, the routine proceeds to step S308 in which the control device 190 uses the specific travel control function to determine whether or not a predetermined time has passed after presentation in step S304 in a state in which the driver does not input response information. When the predetermined time has not passed, the routine proceeds to step S307 in which the travel control process illustrated in FIG. 4 is continued. When the predetermined time has passed without a response from the driver, the routine proceeds to step S309 to cancel the travel control.

In step S305, S306, or S308, even if the driver does not directly select the presentation of the option of "not accept cancel (discard cancel)" on the display of the presentation device 150 via the input device 160, when the driver performs some operation, such as an operation of the steering and/or accelerator pedal and operation of the onboard equipment 140, the control device 190 may deem that the option of "not accept cancel (discard cancel)" of the travel control is selected, and the routine can proceed to step S307.

In step S309, the control device 190 uses the specific travel control function to cancel the travel control process. That is, the control device 190 cancels the travel control by the travel control function. This operation suspends the travel control process illustrated in FIG. 4 and the driver is to drive by himself/herself.

As the above, the travel control device 100 according to the third embodiment estimates whether or not the driver may be in an asleep state (or a drowsy state), on the basis of the history information of the presentation information and response information and the operational history information of the onboard equipment 140. Then, when the driver may be in an asleep state (or a drowsy state), the driver is presented with the presentation information as to whether or not to cancel the travel control process illustrated in FIG. 4. Then, when the driver selects execution of cancel of the travel control or when the driver cannot respond to the presentation information, the travel control process illustrated in FIG. 4 is suspend to force the driver to drive. According to the third embodiment, the following effect can be obtained in addition to those of the first embodiment. That is, when the driver is in an asleep state (or a drowsy state), the driver can thus be forced to drive and stay awake.

Embodiments heretofore explained are described to facilitate understanding of the present invention and are not described to limit the present invention. It is therefore intended that the elements disclosed in the above embodiments include all design changes and equivalents to fall within the technical scope of the present invention.

For example, the above-described embodiments have been each exemplified as a configuration in which the presentation information corresponding to the "scene of catching up with a preceding vehicle" has two options of "follow" and "overtake," but the present invention is not limited to this configuration. This configuration may be modified, for example, to have various options including an option of "change lanes to the right and overtake." The same applies to the presentation information corresponding to other travel scenes.

The above-described second and third embodiments have been each exemplified as a configuration in which the option of "canceling" the specific travel control is set as the default option from among options of the presentation information for inquiring whether or not to perform the specific travel control of driver, but the present invention is not limited to this configuration. This configuration may be modified, for example, to set the option of "executing" the specific travel control as the default option. This configuration may also be modified to change the display mode of the option of "executing" or "canceling" the specific travel control so that the driver can easily select the option of "cancel" as the default option.

In the above-described embodiments, the sensor 110 corresponds to the detection unit of the present invention, the travel scene determination function of the control device 190 corresponds to the determination unit of the present invention, the control device 190 corresponds to the storage unit of the present invention, the presentation information determination function and presentation function of the control device 190 and the presentation device 150 correspond to the presentation unit of the present invention, the input device 160 corresponds to the input unit of the present invention, and the travel control function of the control device 190 and the drive control device 180 correspond to the control unit of the present invention.

DESCRIPTION OF REFERENCE NUMERALS

100 Travel control device
110 Sensor

120 Subject vehicle position detection device
130 Map database
140 Onboard equipment
150 Presentation device
160 Input device
170 Communication device
180 Drive control device
190 Control device

The invention claimed is:

1. A travel control device comprising:
a detection unit configured to detect a travel state of a subject vehicle;
a determination unit configured to determine a travel scene of the subject vehicle on a basis of the travel state of the subject vehicle;
a storage unit configured to store presentation information to be presented to a user in each travel scene;
a presentation unit configured to present the presentation information corresponding to the travel scene to the user;
an input unit for the user to input response information in response to the presentation information; and
a control unit configured to control travel of the subject vehicle on a basis of the response information input via the input unit, wherein
when control to be performed, which corresponds to the travel scene, falls under a plurality of kinds of control, the presentation unit presents the presentation information of the travel scene corresponding to a priority control to the user.

2. The travel control device according to claim 1, wherein the control unit determines the presentation information of the travel scene corresponding to the priority control on the basis of any one of a travel state of a subject vehicle, a driving state of a driver, a state of a road on which the subject vehicle travels, and an environment around the subject vehicle.

3. The travel control device according to claim 1, wherein
the storage unit stores a presentation condition of the presentation information of control to be performed which corresponds to the travel scene, in association with the travel scene, and
the presentation unit presents the presentation information to the user when the subject vehicle satisfies the presentation condition.

4. The travel control device according to claim 3, wherein the control unit changes the presentation condition of the presentation information on the basis of the travel state of the subject vehicle.

5. A travel control device comprising:
a detection unit configured to detect a travel state of a subject vehicle;
a determination unit configured to determine a travel scene of the subject vehicle on a basis of the travel state of the subject vehicle;
a storage unit configured to store presentation information in each travel scene, the presentation information including a plurality of options;
a presentation unit configured to present the presentation information to a user;
an input unit for the user to select one of the plurality of options; and
a control unit configured to control travel of the subject vehicle on a basis of the option selected by the user, wherein the control unit determines one of the plurality of options as a candidate option on the basis of the travel state of the subject vehicle,
the presentation unit presents the presentation information to the user in a state in which the candidate option is selected, and
when the user does not select one of the plurality of options after the presentation information is presented to the user, the control unit regards the candidate option as the option selected by the user and controls the travel of the subject vehicle on a basis of the candidate option.

6. The travel control device according to claim 5, wherein, when the subject vehicle satisfies a predetermined control initiation condition defined for each travel scene before the user selects one of the plurality of options after the presentation unit presents the presentation information to the user, the control unit controls the travel of the subject vehicle on the basis of the candidate option.

7. The travel control device according to claim 5, wherein
the storage unit stores the presentation information, which includes an option of following a preceding vehicle and an option of overtaking the preceding vehicle, as the presentation information corresponding to a scene of catching up with the preceding vehicle, and
when an actual travel scene of the subject vehicle is the scene of catching up with the preceding vehicle, the control unit determines the candidate option from between the option of following the preceding vehicle and the option of overtaking the preceding vehicle on the basis of the travel state of the subject vehicle.

8. The travel control device according to claim 5, wherein
the storage unit stores the presentation information, which includes a plurality of options corresponding to respective booths of a tollgate, as the presentation information corresponding to a scene of approaching the tollgate, and
when an actual travel scene of the subject vehicle is the scene of approaching the tollgate, the control unit determines the candidate option from among the plurality of options corresponding to respective booths of the tollgate on the basis of the travel state of the subject vehicle.

9. The travel control device according to claim 5, wherein
the storage unit stores the presentation information, which includes an option of traveling straight ahead and an option of changing lanes, as the presentation information corresponding to a scene of approaching a merging point, and
when an actual travel scene of the subject vehicle is the scene of approaching the merging point, the control unit determines the candidate option from between the option of traveling straight ahead and the option of changing lanes on the basis of the travel state of the subject vehicle.

10. A travel control device comprising:
a detection unit configured to detect a travel state of a subject vehicle;
a determination unit configured to determine a travel scene of the subject vehicle on a basis of the travel state of the subject vehicle;
a storage unit configured to store presentation information each representing a travel mode which the subject vehicle can execute;
a storage unit configured to store presentation information for each kind of the control to be performed, which corresponds to the travel scene, the presentation information each representing a travel mode which the subject vehicle can execute;
a presentation unit configured to a plurality of items of the presentation information as options when control to be performed, which corresponds to the travel scene, falls under a plurality of kinds of control,
an input unit for the user to select one of the plurality of options; and
a control unit configured to control travel of the subject vehicle on a basis of the option selected by the user, wherein
the presentation unit presents a first option in a first presentation mode and presents a second option in a second presentation mode different from the first presentation mode on the basis of the travel state of the subject vehicle, the first option is a part of the plurality of options included in the presentation information, and the second option is different from the first option among the plurality of options.

11. The travel control device according to claim 10, wherein
the storage unit stores the plurality of items of the presentation information, which includes an option of following a preceding vehicle and an option of overtaking the preceding vehicle, as the presentation information of control to be performed which corresponds to a scene of catching up with the preceding vehicle, and
when an actual travel scene of the subject vehicle is the scene of catching up with the preceding vehicle, the presentation unit presents the option of following the preceding vehicle in one of the first presentation mode and the second presentation mode and presents the option of overtaking the preceding vehicle in the other of the first presentation mode and the second presentation mode, on the basis of the travel state of the subject vehicle.

12. The travel control device according to claim 10 or 11, wherein
the storage unit stores the plurality of items of the presentation information, which includes a plurality of options corresponding to respective booths of a tollgate, as the presentation information of control to be performed which corresponds to a scene of approaching the tollgate, and
when an actual travel scene of the subject vehicle is the scene of approaching the tollgate, the presentation unit presents the option corresponding to a part of the booths from among the plurality of options corresponding to the respective booths in one of the first presentation mode and the second presentation mode and presents the option different from the option corresponding to the part of the booths in the other of the first presentation mode and the second presentation mode, on the basis of the travel state of the subject vehicle.

13. The travel control device according to claim 10, wherein
the storage unit stores the plurality of items of the presentation information, which includes an option of traveling straight ahead and an option of changing lanes, as the presentation information of control to be performed which corresponds to a scene of approaching a merging point, and
when an actual travel scene of the subject vehicle is the scene of approaching the merging point, the presentation unit presents the option of traveling straight ahead in one of the first presentation mode and the second presentation mode and presents the option of changing lanes in the other of the first presentation mode and the second presentation mode, on the basis of the travel state of the subject vehicle.

14. A travel control device comprising:
a detection unit configured to detect a travel state of a subject vehicle;
a determination unit configured to determine a travel scene of the subject vehicle on a basis of the travel state of the subject vehicle;
a storage unit configured to store presentation information to be presented to a user in each travel scene;
a presentation unit configured to present the presentation information corresponding to the travel scene to the user;
an input unit for the user to input response information in response to the presentation information; and
a control unit configured to control automatic travel of the subject vehicle on a basis of the response information input via the input unit, wherein
when a ratio of the number of times of inputting the response information to the number of times of presenting the presentation information is not higher than a predetermined value, the control unit executes controls to cancel the automatic travel as specific control.

15. The travel control device according to claim 14, further comprising
an acquisition unit configured to acquire operational information representing that the user operates onboard equipment,
wherein, when a number of times of operating the onboard equipment during a predetermined period of time until now is not larger than a predetermined number on a basis of the operational information, the control unit executes the specific control.

16. The travel control device according to claim 14 or 15, wherein,
before the control unit executes the specific control, the presentation unit presents specific presentation information to the user, wherein the specific presentation information includes an option for the user to select whether or not to execute the specific control.

17. The travel control device according to claim 16, wherein
the presentation unit determines an option of not executing the specific control as a candidate option from among options included in the specific presentation information and presents the specific presentation information to the user in a state in which the candidate option is selected.

18. The travel control device according to claim 14, wherein, when the user does not select an option, the control unit executes the specific control.

* * * * *